US012572308B2

(12) United States Patent
  Jin

(10) Patent No.: US 12,572,308 B2
(45) Date of Patent: Mar. 10, 2026

(54) STORAGE DEVICE SUPPORTING REAL-TIME PROCESSING AND METHOD OF OPERATING THE SAME

(71) Applicant: SAMSUNG ELECTRONICS CO., LTD., Suwon-si (KR)

(72) Inventor: Sang-Hwa Jin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/776,927

(22) Filed: Jul. 18, 2024

(65) Prior Publication Data

US 2025/0053340 A1      Feb. 13, 2025

(30) Foreign Application Priority Data

Aug. 7, 2023      (KR) ........................ 10-2023-0103097

(51) Int. Cl.
  *G06F 3/06* (2006.01)
(52) U.S. Cl.
  CPC ............ *G06F 3/0659* (2013.01); *G06F 3/061* (2013.01); *G06F 3/0679* (2013.01)
(58) Field of Classification Search
  CPC ...... G06F 3/061; G06F 3/0658; G06F 3/0659; G06F 3/0679; G06F 12/0246; G06F 2212/7202
  See application file for complete search history.

(56) References Cited

U.S. PATENT DOCUMENTS

| | | | |
|---|---|---|---|
| 9,569,242 B2 | 2/2017 | Challa et al. | |
| 10,979,365 B1 | 4/2021 | Choquette et al. | |
| 11,126,375 B2 | 9/2021 | Zhu et al. | |
| 11,237,761 B2 | 2/2022 | Kou et al. | |
| 11,360,917 B2 | 6/2022 | Kim et al. | |
| 11,409,469 B2 | 8/2022 | Jo et al. | |
| 11,561,735 B2 | 1/2023 | Segev et al. | |
| 2021/0200703 A1 * | 7/2021 | Simionescu | .......... G06F 3/0685 |
| 2021/0240393 A1 * | 8/2021 | Jo | ......................... G06F 3/0679 |
| 2022/0066807 A1 | 3/2022 | Kashyap et al. | |
| 2022/0147392 A1 | 5/2022 | Choi et al. | |
| 2023/0315295 A1 * | 10/2023 | Chandrashekaraiah | ..................... G06F 3/0683 |

OTHER PUBLICATIONS

EPO Search Report dated Nov. 13, 2024 In corresponding EP Patent Application 24189410.4.
Junekyo Jhung, et al, Hardware Accelerators for Autonomous Vehicles (First Online: Mar. 16, 2023, Spinger), pp. 269-317.
(Continued)

*Primary Examiner* — Larry T Mackall
(74) *Attorney, Agent, or Firm* — Morgan, Lewis & Bockius LLP

(57) ABSTRACT

A storage device includes a nonvolatile memory device and a storage controller configured to control the nonvolatile memory device under control of a plurality of hosts. The storage controller includes a plurality of physical functions, respectively corresponding to the plurality of hosts, and a real-time manager configured to control the plurality of physical functions based on real-time information of a real-time command when the real-time command is issued from at least one host among the plurality of hosts.

20 Claims, 21 Drawing Sheets

(56)  References Cited

OTHER PUBLICATIONS

Mihir Mody, et al. Single Chip Traction Inverter System using High Performance and Real-time AM263 MCU ('23, IEEE).
Jaekwon Lee, Probabilistic WCET Estimation for Weakly Hard Real-Time Systems ('23, arXiv).
Lucia Lo Bello, A Perspective on Ethernet in Automotive Communications—Current Status and Future Trends ('23, MDPI).
Youssef El Kharaz, Comparison between AUTOSAR Platforms with Functional Safety for Automotive Software Architectures ('23, arXiv).

* cited by examiner

Figure 1:
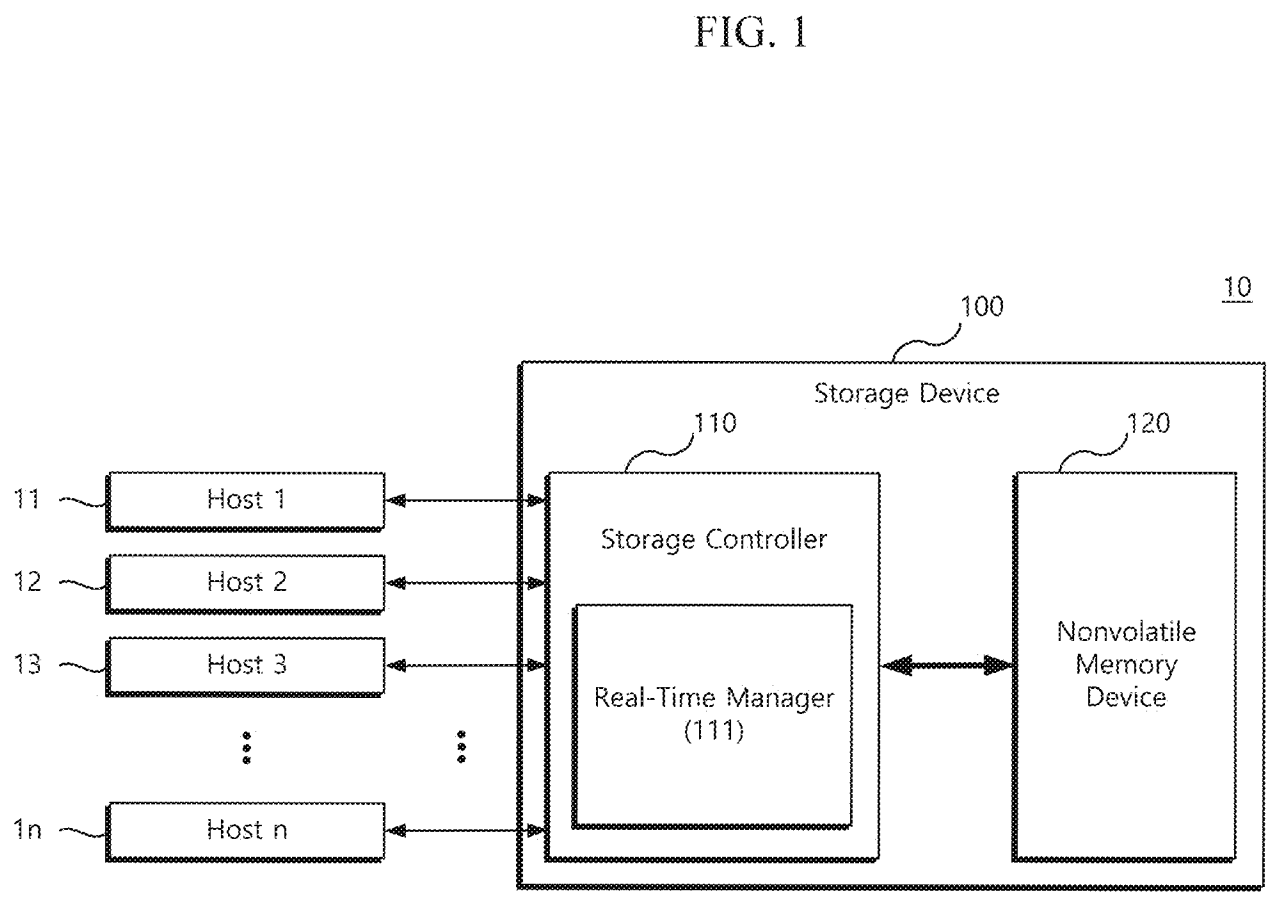

Storage Device

100

Storage Controller
110

Real-Time Manager
(111)

120

Nonvolatile
Memory
Device

Host 1    11
Host 2    12
Host 3    13

• • •

Host n    1n

| Bits | Attribute |
|---|---|
| 03:00 | Access Frequency |
| 05:04 | Access Latency |
| 06 | Sequential Request |
| 07 | Incompressible |
| 31:08 | RTI (Real Time Information) |

[CMD]

FIG. 6B

| Bits | Attribute |
|---|---|
| 31:08 | RT_Flag |
| | RT_Limit |
| | ASIL Grade |
| | SQ time |
| | reserved |

[RTI field]

| Host | PF | ASIL Grade | RT_Limit |
|------|------|------------|--------------------|
| ECU1 | PF1 | D | RT_Limit 1 (10ms) |
| ECU2 | PF2 | C | RT_Limit 2 (20ms) |
| ECU3 | PF3 | B | RT_Limit 3 (30ms) |
| ECU4 | PF4 | A | None |

[Real Time Setting Table]

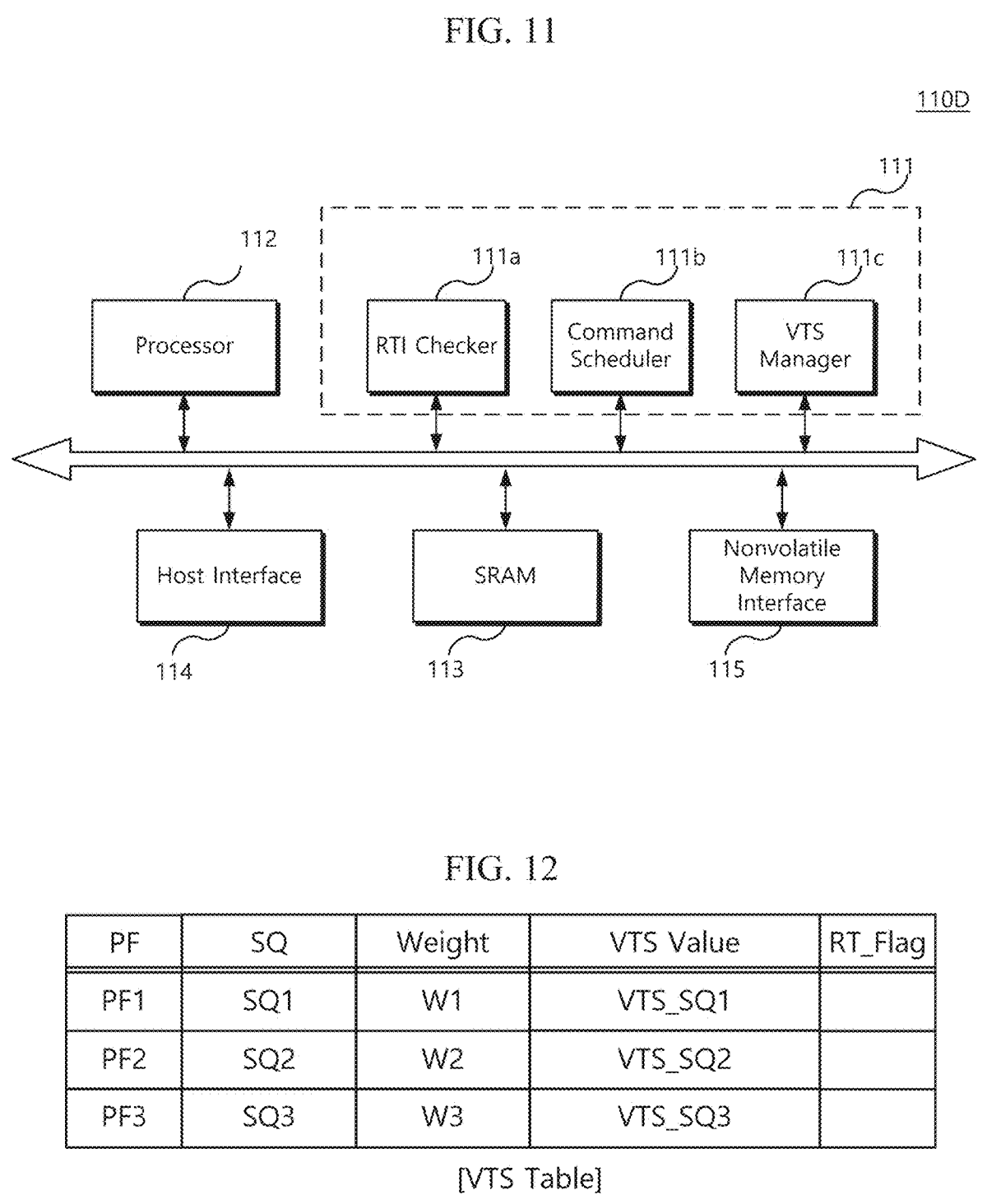

RTI Checker  111a

Command Scheduler  111b

VTS Manager  111c

Processor

Host Interface
114

SRAM
113

Nonvolatile Memory Interface
115

FIG. 12

| PF | SQ | Weight | VTS Value | RT_Flag |
|----|----|--------|-----------|---------|
| PF1 | SQ1 | W1 | VTS_SQ1 | |
| PF2 | SQ2 | W2 | VTS_SQ2 | |
| PF3 | SQ3 | W3 | VTS_SQ3 | |

[VTS Table]

[Resource Pool]

110F

STORAGE DEVICE SUPPORTING REAL-TIME PROCESSING AND METHOD OF OPERATING THE SAME

CROSS-REFERENCE TO RELATED APPLICATION(S)

This application claims priority under 35 U.S.C. § 119 to Korean Patent Application No. 10-2023-0103097, filed on Aug. 7, 2023 in the Korean Intellectual Property Office, the disclosure of which is incorporated by reference herein in its entirety.

TECHNICAL FIELD

Example embodiments of the present disclosure relate to a storage system.

DISCUSSION OF RELATED ART

Semiconductor memory devices are classified into volatile memory devices, in which stored data is lost when a power supply is interrupted, such as, for example, a static random access memory (SRAM) or a dynamic random access memory (DRAM), and nonvolatile memory devices, in which stored data is retained even when a power supply is interrupted, such as, for example, a flash memory device, a phase-change RAM (PRAM), a magnetic RAM (MRAM), a resistive RAM (RRAM), or a ferroelectric RAM (FRAM).

Recently, research into multi-host storage systems has been actively conducted. A multi-host storage system may refer to a system in which a single storage medium supports a plurality of hosts or a plurality of tenants. In this case, the plurality of hosts accesses the single storage medium, resulting in an issue in which commands, requested to be processed urgently or in real time on a specific host, are not processed in a timely manner on the storage medium.

SUMMARY

Example embodiments of the present disclosure provide a storage system that may effectively process real-time commands received from a host within a predetermined time.

According to an example embodiment, a storage device includes a nonvolatile memory device and a storage controller configured to control the nonvolatile memory device under control of a plurality of hosts. The storage controller includes a plurality of physical functions, respectively corresponding to the plurality of hosts, and a real-time manager configured to control the plurality of physical functions based on real-time information of a real-time command when the real-time command is issued from at least one host among the plurality of hosts.

According to an example embodiment, a method of operating a storage device including a plurality of physical functions, respectively corresponding to a plurality of hosts, includes obtaining real-time information on a real-time command issued by at least one host among the plurality of hosts, determining performance of a physical function corresponding to the real-time command among the plurality of physical functions, based on the real-time information, and fetching the real-time command and processing the fetched real-time command.

According to an example embodiment, a storage controller that controls a nonvolatile memory device includes a plurality of physical functions, respectively corresponding to a plurality of hosts and independently controlling the nonvolatile memory device based on a request of each of the plurality of hosts, and a real-time manager configured to perform a performance control operation on the plurality of physical functions based on real-time information of a real-time command when the real-time command is issued from at least one host among the plurality of hosts.

BRIEF DESCRIPTION OF DRAWINGS

The above and other features of the present disclosure will become more apparent by describing in detail embodiments thereof with reference to the accompanying drawings.

FIG. 1 is a block diagram illustrating a storage system according to an example embodiment.

FIGS. 3A and 3B are diagrams, each illustrating a physical function of a storage controller according to an example embodiment.

FIGS. 6A and 6B are diagrams illustrating an example of a real-time information field according to an example embodiment.

FIG. 9 is a diagram illustrating an example of an operation of a storage controller according to an example embodiment.

FIG. 11 is a block diagram illustrating a storage controller according to an example embodiment.

FIG. 12 is a diagram illustrating an example of a virtual time stamp (VTS) table according to an example embodiment.

DETAILED DESCRIPTION

Figure 2:
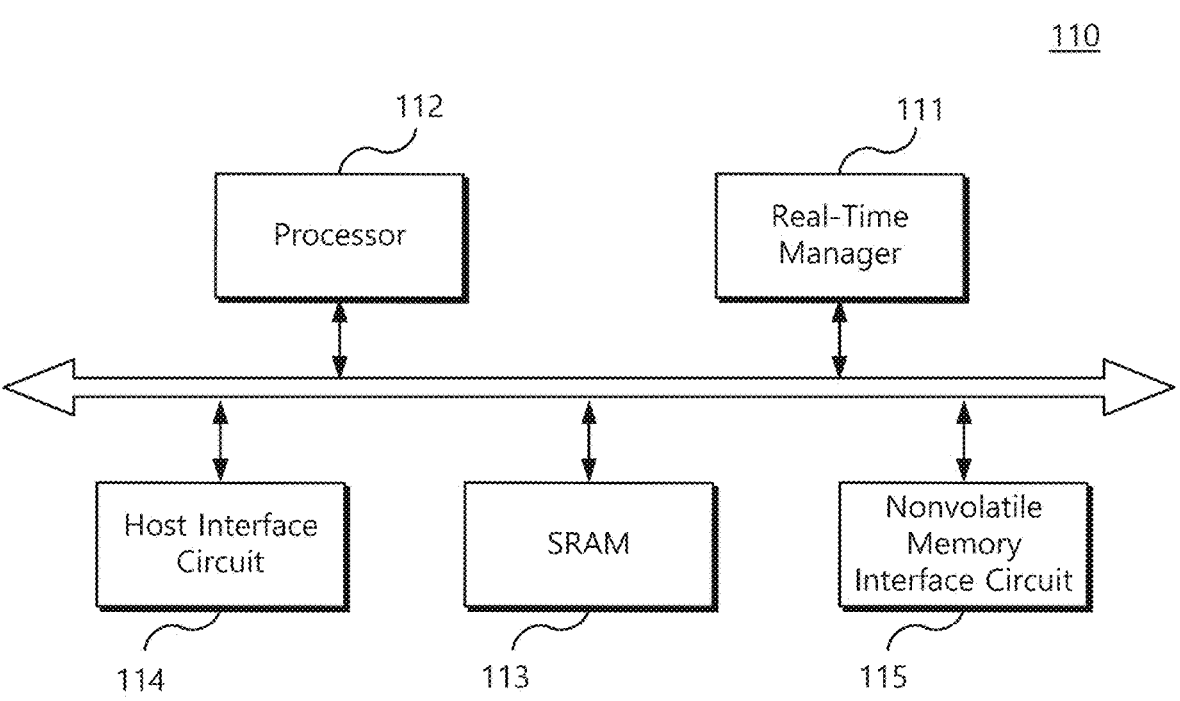
FIG. 2 is a block diagram illustrating an example of a storage controller according to an example embodiment.

Embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an example embodiment may be described as a "second" element in another example embodiment.

It should be understood that descriptions of features or aspects within each example embodiment should typically be considered as available for other similar features or aspects in other example embodiments, unless the context clearly indicates otherwise.

As used herein, the singular forms "a", "an" and "the" are intended to include the plural forms as well, unless the context clearly indicates otherwise.

[Storage System Supporting Real-Time Processing of Commands]

FIG. 1 is a block diagram illustrating a storage system 10 according to an example embodiment.

The storage system 10 according to an example embodiment may include a plurality of hosts 11 to 1n, where n is a positive integer, and a storage device 100. The storage device 100 may be configured to support multiple hosts or multiple tenants. At least one of the plurality of hosts 11 to 1n may transmit a real-time command to the storage device 100. The storage device 100 may receive the real-time command, and may process the received real-time command within a predetermined time.

In this case, the storage device 100 according to an example embodiment may obtain real-time information corresponding to the received real-time command, and may perform function control operations, such as, for example, selection of a physical function, determination of resource distribution, or determination of fetch timing, based on the real-time information. Accordingly, the storage device 100 according to an example embodiment may effectively process a real-time command received from a host within a predetermined time.

The plurality of hosts 11 to 1n may correspond to the same storage device 100. For example, the storage system 10 may be a multi-host storage system.

According to an example embodiment, the storage system 10 may be a storage system applied to an automotive system. According to an example embodiment, the storage system 10 may be a storage system applied to various information processing devices such as, for example, a server, a personal computer (PC), a laptop computer, a workstation, a smartphone, a tablet PC, or the like.

Each of the plurality of hosts 11 to 1n may be configured to access the storage device 100.

According to an example embodiment, the plurality of hosts 11 to 1n may be computing nodes configured to operate independently from each other, respectively. For example, when the storage system 10 is implemented as an automotive system, each of the plurality of hosts 11 to 1n may be an electronic control unit (ECU) controlling at least one function, among functions such as, for example, engine management, airbag, headlight, radar cruise control, electric power steering, advanced driver assistance system (ADAS), active suspension, braking, brake light, view camera, instrument cluster, or the like.

According to an example embodiment, the plurality of hosts 11 to 1n may be single-core or multi-core processors included in different computing nodes (or computing systems). Alternatively, at least a portion of the plurality of hosts 11 to 1n may be different processors included in the same computing node (or computing system). Alternatively, the plurality of hosts 11 to 1n may be processors configured to process different applications.

The storage device 100 may operate under the control of each of the plurality of hosts 11 to 1n. For example, the storage device 100 may be a single storage device or a storage device configured to support multiple hosts or multiple tenants.

According to an example embodiment, the plurality of hosts 11 to 1n and the storage device 100 may communicate with each other based on a Peripheral Component Interconnect express (PCI-express) interface or a nonvolatile memory express (NVMe) interface based on PCI-express. However, this is only an example, and example embodiments are not limited thereto. For example, according to an example embodiment, the plurality of hosts 11 to 1n and the storage device 100 may communicate with each other based on an Ethernet interface. For example, according to an example embodiment, one of the plurality of hosts 11 to 1n may communicate with the storage device 100 based on the PCI-express interface, and another of the plurality of hosts 11 to 1n may communicate with the storage device 100 based on the Ethernet interface.

The storage device 100 may include a storage controller 110 and a nonvolatile memory device 120. The storage controller 110 may store data in the nonvolatile memory device 120 under the control of each of the plurality of hosts 11 to 1n. Alternatively, the storage controller 110 may provide data, stored in the nonvolatile memory device 120, to the plurality of hosts 11 to 1n under the control of each of the plurality of hosts 11 to 1n.

At least one of the plurality of hosts 11 to 1n may transmit a real-time command to the storage device 100. The real-time command may refer to a command requested to be processed urgently or a command requested to be processed in real time. The storage device 100 may receive a real-time command and then process the received real-time command within a real-time limit. The real-time limit may be defined in various ways according to example embodiments.

According to an example embodiment, the real-time limit may be defined as the time from a time point at which a host writes a real-time command in a submission queue to a time point at which the storage device 100 writes a response to the real-time command in a completion queue.

According to an example embodiment, the real-time limit may be defined as the time from a time point at which a host writes a real-time command in a submission queue to a time point at which the host take a response to the real-time command written in a completion queue.

According to an example embodiment, the real-time limit may be defined as the time from a time point at which the storage device 100 fetches a real-time command from a submission queue to a time point at which the storage device 100 writes a response to the real-time command in a completion queue.

The storage device 100 may fetch and process a real-time command until a real-time limit corresponding to the real-time command elapses, and may write a response to the real-time command in a completion queue.

The storage controller 110 according to an example embodiment may include a real-time manager 111 that effectively processes the real-time command transmitted from the host within the real-time limit.

The real-time manager 111 may check whether a real-time command has been issued. The real-time manager 111 may check whether a real-time command has been issued in various manners according to example embodiments.

According to an example embodiment, the real-time manager 111 may periodically check whether a real-time command has been issued. According to an example embodiment, the host may transmit information on the issuance of the real-time command to the storage device 100, and the real-time manager 111 may check whether the real-time command has been issued, based on the information. The host may transmit additional information, such as, for example, real-time limit and processing time, to the storage device 100.

When the real-time command is issued, the real-time manager 111 may obtain real-time information corresponding to the real-time command.

According to an example embodiment, the real-time manager 111 may selectively access a submission queue corresponding to a real-time command. The submission queue may be defined as a storage space in which a host stores a real-time command and/or real-time information to be transmitted to the storage device 100. The real-time manager 111 may obtain real-time information from a submission queue corresponding to the real-time command.

According to an example embodiment, the real-time manager 111 may selectively access a physical function corresponding to a real-time command and a submission queue corresponding to the physical function.

The real-time manager 111 may control the storage device 100 or each physical function in various manners according to example embodiments, based on the obtained real-time information.

According to an example embodiment, the real-time manager 111 may fetch a real-time command based on the obtained real-time information. Then, the real-time manager 111 may control a series of operations, such as, for example, a read operation or a write operation, to effectively process data of the real-time command issued by the host within the real-time limit.

According to an example embodiment, the real-time manager 111 may perform performance control operations on the storage device 100 or each physical function, such as, for example, selection of a physical function, determination of resource distribution, or determination of fetch timing, based on the obtained real-time information. Accordingly, the real-time commands may be effectively processed within the real-time limit.

As described above, the storage device 100 according to an example embodiment may control the operation and/or performance of the storage device 100 based on the real-time information. Accordingly, the storage device 100 may effectively process the real-time command received from the host within the real-time limit.

FIG. 2 is a block diagram illustrating an example of a storage controller according to an example embodiment. For example, the storage controller 110 of FIG. 2 may be the storage controller 110 of FIG. 1.

Referring to FIG. 2, the storage controller 110 may include a real-time manager 111, a processor 112, a static random access memory (SRAM) 113, a host interface circuit 114, and a nonvolatile memory interface 115.

The real-time manager 111 may identify whether a real-time command is issued. When a real-time command is issued, the real-time manager 111 may obtain real-time information corresponding to the real-time command.

According to an example embodiment, the real-time manager 111 may obtain real-time information from the host. For example, a real-time command may include a real-time information field, and the host may write real-time information, such as real-time limit or SQ time, in the real-time information field. The SQ time may refer to a time point at which a real-time command is written in the submission queue. The real-time manager 111 may obtain real-time information through the real-time information field of the real-time command received from the host. However, this is only an example, and the host may transmit additional information, such as the issuance or processing time of the real-time command, to the storage device 100, separately from the real-time command.

According to an example embodiment, the real-time manager 111 may obtain real-time information from the storage device 100 (see FIG. 1). For example, each of the plurality of hosts 11 to 1n may have unique real-time information, and the real-time information corresponding to each host may be managed by the storage device 100 in the form of a table. The real-time information managed by the storage device 100 in the form of a table may be referred to as a real-time setting table. The real-time manager 111 may obtain real-time information through the real-time setting table managed by the storage device 100.

After obtaining the real-time information, the real-time manager 111 may control the performance of the storage device 100 or each physical function to effectively process a real-time command within a real-time limit.

According to an example embodiment, the real-time manager 111 may select one of physical functions corresponding to each host based on the real-time information. For example, the storage device 100 may include a plurality of physical functions, and each of the plurality of hosts may correspond to at least one physical function. In this case, the real-time manager 111 may preferentially select a physical function corresponding to a host which has issued the real-time command from among a plurality of physical functions.

According to an example embodiment, the real-time manager 111 may determine resource distribution of the storage device 100 based on real-time information. For example, the real-time manager 111 may distribute a relatively large number of resources to physical functions corresponding to the host which has issued the real-time command. For example, the real-time manager 111 may further adjust the resources, respectively distributed to the physical functions, by additionally referring to a state of a completion queue of the host which has issued the real-time command.

According to an example embodiment, the real-time manager 111 may determine fetch timing of the real-time command based on the real-time information. For example, the shorter the real-time limit, the more the real-time manager 111 may control each physical function to rapidly fetch the real-time command.

The processor 112 may control the overall operation of the storage controller 110. For example, the processor 112 may execute various applications (for example, a flash translation layer (FTL)) running on the storage controller 110.

The SRAM 113 may be used as, for example, a buffer memory, a working memory, or a cache memory of the storage controller 110.

According to an example embodiment, the real-time manager 111 may be implemented in the form of software, hardware, or a combination thereof. For example, when the real-time manager 111 is implemented in the form of software, information associated with the real-time manager 111 may be stored in the SRAM 113 and the real-time manager 111 stored in the SRAM 113 may be executed by the processor 112.

According to an example embodiment, the real-time setting information may be stored in the nonvolatile memory device 120 (see FIG. 1). For example, when the storage system 10 is powered up, the real-time setting information stored in the nonvolatile memory device 120 may be loaded into the SRAM 113 and the real-time setting information may be referred to by the real-time manager 111.

The host interface circuit 114 may communicate with the plurality of hosts 11 to 1n through a predetermined interface. For example, the predetermined interface may include at least one of various host interfaces such as a Peripheral Component Interconnect express (PCI-express) interface, a nonvolatile memory express (NVMe) interface, a Serial ATA (SATA) interface, a Serial Attached SCSI (SAS) interface, or a Universal Flash Storage (UFS) interface Hereinafter, for ease of description, an example will be provided in which the host interface circuit 114 is implemented based on an NVMe interface. For example, the host interface circuit 114 may communicate with each of a plurality of hosts 11 to 1n through a physical layer based on a PCI-express interface, and may process information, received from the plurality of host 11 to 1n, through a physical function.

According to an example embodiment, a physical function may be included in the host interface circuit 114, and a plurality of physical functions may correspond to a plurality of hosts 11 to 1n (see FIG. 1). According to an example embodiment, when the real-time manager 111 is implemented in the form of hardware, the real-time manager 111 may be implemented to be included in the host interface circuit 114.

The nonvolatile memory interface circuit 115 may provide communication between the storage controller 110 and the nonvolatile memory device 120. For example, when the nonvolatile memory device 120 is a NAND flash memory device, the nonvolatile memory interface circuit 115 may be a NAND interface. In this case, the nonvolatile memory interface circuit 115 may support multi-way/multi-channel for a plurality of NAND flash memories included in the nonvolatile memory device 120.

As described above, the storage controller 110 according to an example embodiment may include the real-time manager 111, and the real-time manager 111 may manage performance of a storage device or each physical function based on real-time information. Accordingly, a real-time command received from a host may be effectively processed within a real-time limit.

Figure 3A:
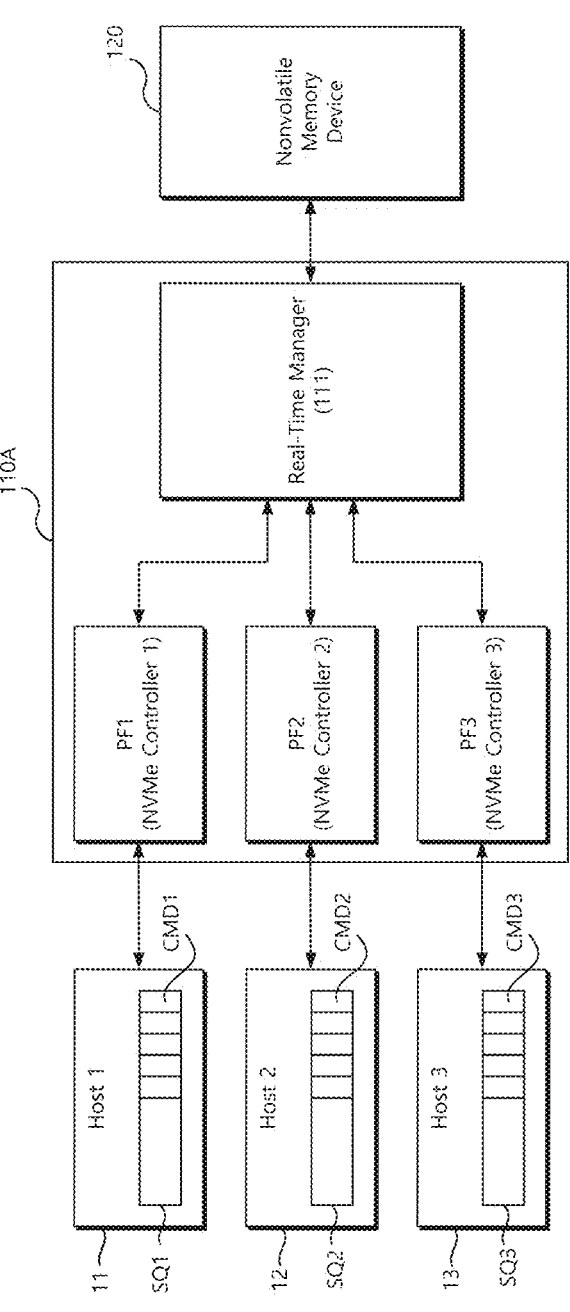
Figure 3B:
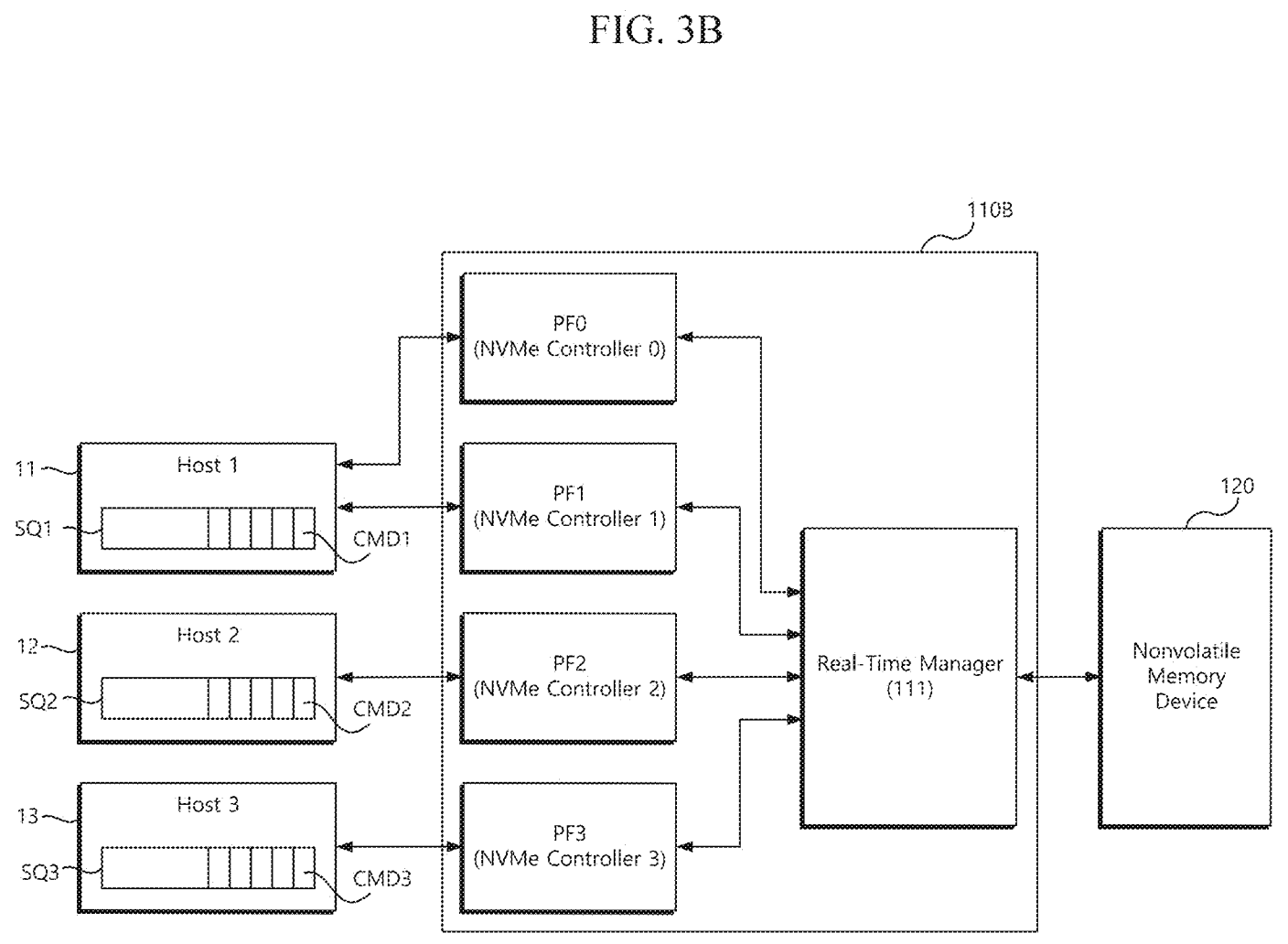

FIGS. 3A and 3B are diagrams, each illustrating a physical function of a storage controller according to an example embodiment. For example, storage controllers 110A and 110B of FIGS. 3A and 3B may be the storage controller 110 of FIGS. 1 and 2. Below, components which are not utilized to describe a physical function (hereinafter referred to as "PF"), will be omitted for ease of description.

The physical function PF may refer to an NVMe controller corresponding to each of the plurality of hosts 11 to 1n.

According to an example embodiment, the physical function PF may be implemented in the form of software, hardware, or a combination thereof.

According to an example embodiment, the physical function PF may refer to a PCI-express function supporting a single root I/O virtualization (SR-IOV) function configured to allow the physical function PF to support one or more dependent virtual functions.

The physical function PF may correspond to at least one of the plurality of hosts 11 to In, and may be understood as being configured to process a command of the submission queue managed by a corresponding host, among the plurality of hosts 11 to 1n. For ease of description, an example will be provided in which the storage controllers 110A and 110B communicate with three hosts 11, 12, and 13, but example embodiments are not limited thereto.

Referring to FIG. 3A, each of the first to third hosts 11 to 13 may issue commands CMD1 to CMD3. For example, the first host 11 may issue the first command CMD1, and the issued first command CMD1 may be written in a first submission queue SQ1. The second host 12 may issue a second command CMD2, and the issued second command CMD2 may be written in a second submission queue SQ2. The third host 13 may issue a third command CMD3, and the issued third command CMD3 may be written in a third submission queue SQ3.

For ease of description, in FIG. 3A, each of the first to third hosts 11 to 13 is illustrated as managing a single submission queue, but example embodiments are not limited thereto. For example, according to an example embodiment, each of the first to third hosts 11 to 13 may manage a plurality of submission queues. For example, according to an example embodiment, each of the first to third hosts 11 to 13 may further manage a completion queue configured to receive responses to a plurality of submission queues. For example, according to an example embodiment, each of the first to third hosts 11 to 13 may issue an administrative command and may further manage an administration queue and an administration completion queue configured to receive a response to the administrative command.

The storage controller 110A may communicate with the first to third hosts 11 to 13. For example, according to an example embodiment, the storage controller 110A may communicate with the first to third hosts 11 to 13 through an interface based on a physical layer of a PCI-express interface (for example, NVMe over PCI-express). For example, according to an example embodiment, the storage controller 110A may communicate with the first to third hosts 11 to 13 through a network-based interface (for example, NVMe over Fabrics (NVMe-oF)) such as a fiber channel or a remote direct random access memory (RDMA).

The storage controller 110A may communicate with the first to third hosts 11 to 13 through various types of physical layers. For example, the storage controller 110A includes first to third physical functions PF1 to PF3. The first to third physical functions PF1 to PF3 may correspond to the first to third hosts 11 to 13, respectively. The first to third physical functions PF1 to PF3 may be included in the host interface circuit 114 or may be implemented on the host interface circuit 114.

For example, the first physical function PF1 may communicate with the first host 11 and may be configured to process a first command CMD1 from the first host 11. The second physical function PF2 may communicate with the second host 12 and may be configured to process a second command CMD2 from the second host 12. The third physical function PF3 may communicate with the third host 13 and may be configured to process a third command CMD3 from the third host 13. Accordingly, the first to third physical functions PF1 to PF3 may be referred to as first to third NVMe controllers NVMe Controller1 to NVMe Controller3, respectively.

The first to third physical functions PF1 to PF3 may perform an operation of the nonvolatile memory device 120 based on a command from a corresponding host. For example, according to an example embodiment, the nonvolatile memory device 120 may be managed as a logically divided namespace NS. In this case, each of the first to third physical functions PF1 to PF3 may perform an operation corresponding to a command on a corresponding namespace. For example, according to an example embodiment, the nonvolatile memory device 120 may be managed as a physically or logically divided nonvolatile memory (NVM) set. In this case, each of the first to third physical functions PF1 to PF3 may perform an operation corresponding to a command on a corresponding nonvolatile memory set.

The real-time manager 111 may control an operation or performance of the first to third physical functions PF1 to PF3 based on real-time information corresponding to a real-time command. For example, according to an example embodiment, the real-time manager 111 may schedule physical functions to process a command, among the first to third physical functions PF1 to PF3, based on real-time information. For example, according to an example embodiment, the real-time manager 111 may determine resources of the storage device 100 to be respectively distributed to the first to third physical functions PF1 to PF3 based on real-time information. For example, according to an example embodiment, the real-time manager 111 may determine timing at which a command of each of the first to third physical functions PF1 to PF3 is to be fetched based on real-time information.

In FIG. 3A, a single host is illustrated as communicating with a single physical function. However, this is only an example, and example embodiments are not limited thereto. According to an example embodiment, a single host may communicate with a plurality of physical functions. For example, the storage controller 110B may include zeroth to fourth physical functions PF0 to PF3, as illustrated in FIG. 3B. The first host 11 may communicate with the zeroth and first physical functions PF0 and PF1.

In FIGS. 3A and 3B, a single physical function is illustrated as corresponding to a single submission queue. However, this is only an example, and example embodiments are not limited thereto. According to an example embodiment, a single physical function may correspond to a plurality of submission queues. In this case, the single physical function may correspond to a plurality of submission queues belonging to the same host. According to an example embodiment, a single physical function may correspond to a plurality of submission queues belonging to different hosts.

As described above, the storage controllers 110A and 110B according to an example embodiment may include a plurality of physical functions PFs and the real-time manager 111, and the real-time manager 111 may schedule commands of the plurality of physical functions PFs, determine resources to be distributed to the plurality of physical functions PFs, or determine fetch timing for commands of the plurality of physical functions, based on real-time information. Accordingly, a real-time command received from the host may be effectively processed within a real-time limit.

Figure 4:
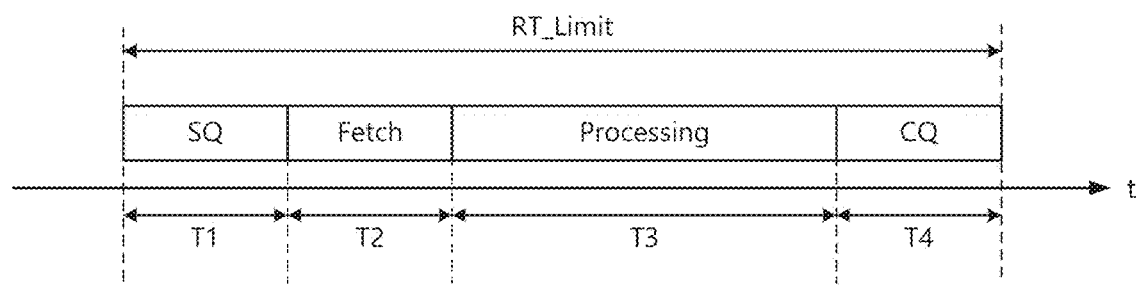
FIG. 4 is a timing diagram illustrating an operation of the storage device of FIGS. 1 to 3.

FIG. 4 is a timing diagram illustrating an operation of the storage device of FIGS. 1 to 3.

Hereinafter, for ease of description, an example will be provided in which one of the plurality of hosts 11 to 1n (see FIG. 1) issues a real-time command. A real-time limit RT_Limit may be defined as the time from a time point at which a host writes a real-time command in a submission queue SQ to a time point at which the host takes a response to the real-time command from a completion queue CQ.

During a time T1, the host may issue a real-time command that utilizes real-time processing. In this case, the host may write the real-time command in the submission queue SQ. Then, the storage controller 110 (see FIG. 1) may check whether a real-time command has been issued, and may obtain real-time information corresponding to the real-time command.

According to an example embodiment, the host may transmit information that a real-time command has been issued to the storage controller 110. For example, the host may transmit an interrupt signal to the storage controller 110 through an additional channel, different from a channel through which the command is transmitted. In this case, the storage controller 110 may check whether a real-time command has been issued through an interrupt signal, and may first fetch the real-time command from the submission queue. For example, the storage controller 110 may preferentially fetch the real-time command rather than fetching commands sequentially in the submission queue.

According to an example embodiment, the real-time command may include a real-time information field, and the host may write real-time information such as a real-time limit RT_Limit in the real-time information field. The storage controller 110 may obtain the real-time information through the real-time information field of the real-time command.

According to an example embodiment, the plurality of hosts 11 to 11n may have different real-time limits RT_Limit, and the real-time limit RT_Limit for each of the plurality of hosts 11 to 11n may be managed by the storage device 100 in the form of a table. In this case, the real-time information, other than the real-time limit RT_Limit, may also be managed by the storage device 100 in the form of a table. When a real-time command is issued by a host, the storage controller 110 may obtain real-time information on the real-time command from the storage device 100.

During a time T2, the storage controller 110 may select a single physical function from among the plurality of physical functions based on the real-time information. The storage controller 110 may fetch a real-time command from the host corresponding to the selected physical function. The storage controller 110 may determine fetch timing for the real-time command based on the real-time information.

According to an example embodiment, the storage controller 110 may preferentially select a physical function corresponding to a real-time command from among the plurality of physical functions such that the real-time command may be processed before general commands.

According to an example embodiment, when each of the plurality of hosts issues a real-time command, the storage controller 110 may preferentially select a physical function corresponding to a real-time command having a shortest real-time limit RT_Limit from among the plurality of physical functions.

According to an example embodiment, the shorter the real-time limit RT_Limit, the faster the storage controller 110 may fetch real-time commands from the submission queue SQ.

According to an example embodiment, the longer the time since a real-time command was written to the submission queue SQ, the faster the storage controller 110 may fetch the real-time command from the submission queue SQ.

During a time T3, the storage controller 110 may process the fetched real-time command. In this case, the storage controller 110 may determine resource distribution for the plurality of physical functions based on the real-time information and/or a state of a completion queue CQ.

According to an example embodiment, distribution of resources of the storage device 100 may be managed using tokens. For example, the number of tokens may correspond to the amount of the resources of the storage device 100. The storage controller 110 may distribute a relatively small number of tokens to a physical function to process general commands, and may distribute a relatively large number of tokens to a physical function to process real-time commands.

According to an example embodiment, when a plurality of physical functions process real-time commands, the storage controller 110 may distribute a relatively large number of tokens to a physical function to process a real-time command having a relatively short real-time limit RT_Limit, and may distribute a relatively small number of tokens to a physical function to process a real-time command having a relatively long real-time limit RT_Limit.

According to an example embodiment, the storage controller 110 may adjust the number of tokens by referring to responses accumulated in the completion queue CQ. The responses accumulated in the completion queue CQ may be responses that have not yet been confirmed or referenced by a host. The storage controller 110 may distribute a relatively small number of tokens to physical functions corresponding to hosts having a large number of responses accumulated in the completion queue CQ, and may distribute a relatively large number of tokens to physical functions corresponding to hosts having a small number of responses accumulated in the completion queue CQ.

During a time T4, the storage controller 110 may write a response to the real-time command in a completion queue CQ of a corresponding host.

According to an example embodiment, the storage controller 110 may provide a host with information on a response after the response is written in the completion queue CQ. For example, the storage controller 110 may provide the host with information that the response has been written in the completion queue CQ using an interrupt signal, or the like.

Alternatively, according to an example embodiment, the storage controller 110 may allow a host to take a response to a real-time command first by placing the response at the front of the completion queue CQ.

Alternatively, according to an example embodiment, the storage controller 110 may monitor whether a host has made a response. When the host does not take the response, the storage controller 110 may periodically provide the host with information that the response has been written in the completion queue CQ, using an interrupt signal or the like.

As described above, the storage controller according to an example embodiment may control the performance of a storage device based on real-time information and/or a state of a completion queue CQ. Accordingly, a real-time command received from a host may be effectively processed within a real-time limit.

[Storage Controller Obtaining Real-Time Information]

Figure 5:
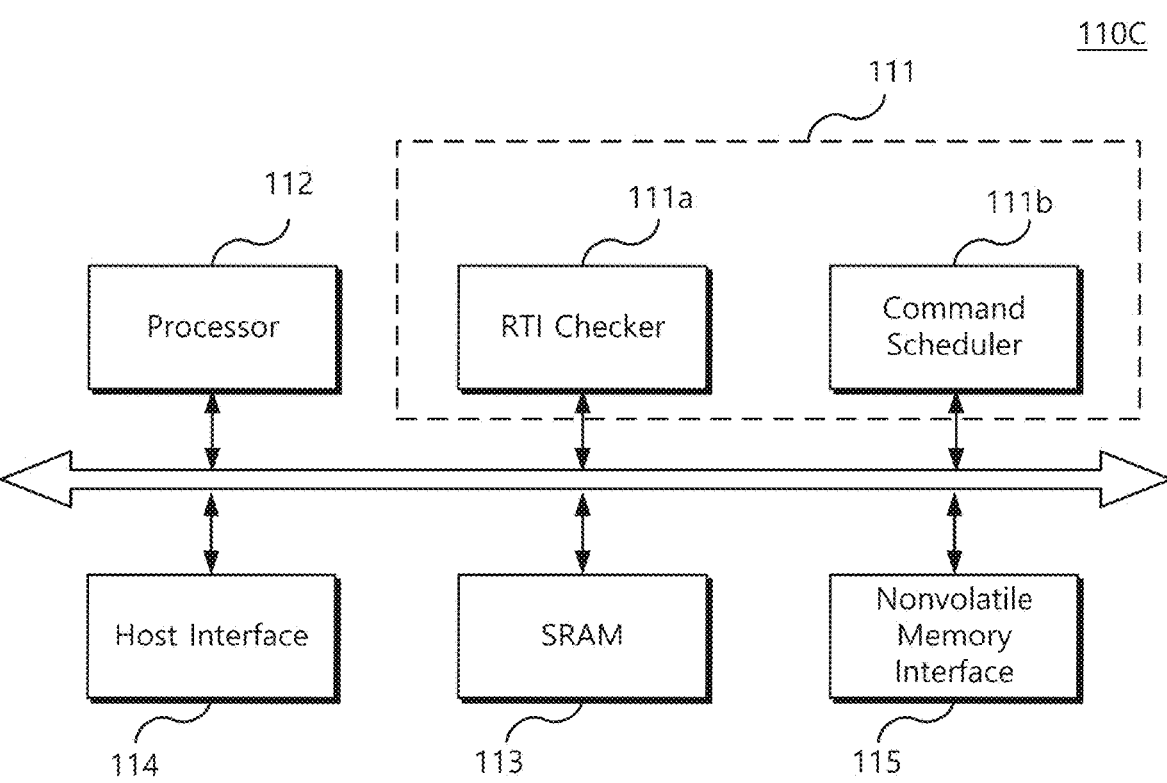
FIG. 5 is a block diagram illustrating a storage controller according to an example embodiment.

FIG. 5 is a block diagram illustrating a storage controller according to an example embodiment. For example, the storage controller 110C of FIG. 5 may be an example of the storage controller 110 of FIG. 2. The storage controller 110C of FIG. 5 is similar to the storage controller 110 of FIG. 2. Therefore, for convenience of explanation, redundant descriptions will be omitted below.

Referring to FIG. 5, the storage controller 110C may include a real-time manager 111, a processor 112, a static random access memory (SRAM) 113, a host interface circuit 114, and a nonvolatile memory interface circuit 115. The real-time manager 111 may include a real-time information checker RTI 111a and a command scheduler 111b.

The RTI checker 111a may check real-time information corresponding to a real-time command. For example, when the real-time command includes a real-time information field, the RTI checker 111a may obtain real-time information through the real-time information field. For example, when the storage device 100 (see FIG. 1) manages real-time information on each of the plurality of hosts 11 to 1n (see FIG. 1) through a real-time setting table, the RTI checker 111a may obtain real-time information through a real-time setting table.

The command scheduler 111b may be configured to schedule commands from each of the plurality of hosts 11 to in. For example, when a real-time command is issued from at least one of the plurality of hosts 11 to in, the command scheduler 111b may control the performance of the storage device 100 based on real-time information corresponding to the real-time command. For example, the command scheduler 111b may preferentially select a physical function corresponding to a real-time command from among a plurality of physical functions based on the real-time information.

Hereinafter, an example of obtaining real-time information through a real-time information field of a command will be described in more detail with reference to FIGS. 6 and 7. In addition, an example of obtaining real-time information through a real-time setting table will be described in more detail with reference to FIGS. 8 to 10.

FIGS. 6A and 6B are diagrams illustrating an example of a real-time information field according to an example embodiment. For example, an example of a real-time command RTI_CMD is illustrated in FIG. 6A, and an example of a real-time information field RTI_field is illustrated in FIG. 6B.

For ease of description, in FIGS. 6A and 6B, an example is provided in which a real-time command RTI_CMD is a read command. In addition, an example is provided in which a storage system is an automotive system, and it is assumed that a real-time limit RT_Limit is determined based on an automotive safety integrity level (ASIL) grade.

Referring to FIG. 6A, a real-time command RTI_CMD may include a dataset management (DSM) field and a real-time information field RTI. The DSM field may include information for reading data of a logical block. For example, the DSM field may include an access frequency field, an access latency field, a sequential request field, or an incompressible field.

Referring to FIG. 6B, a real-time information field RTI may include real-time information. For example, the real-time information field RTI may include a real-time flag RT_Flag, an ASIL grade, a real-time limit RT_Limit, and SQ time.

The real-time flag RT_Flag may indicate whether a command is a real-time command or a general command. For example, when the real-time flag RT_Flag is enabled high, the command may be a real-time command requested for real-time processing. When the real-time flag RT_Flag is disabled low, the command may be a general command.

The ASIL grade may indicate a safety level associated with a command. For example, the ASIL grade may be a safety grade defined by ISO 26262, an international standard for functional safety of electrical and/or electronic systems in road vehicles. In this case, the ASIL grade may be divided into four levels A, B, C, and D based on the likelihood of accidence occurrence, severity, and driver controllability.

The real-time limit RT_Limit may indicate time information that the command should be processed. For example, according to an example embodiment, a real-time limit may be defined as the time from a time point at which a host writes a real-time command in a submission queue to a time point at which the host takes a response to the real-time command from the completion queue. For example, according to an example embodiment, the real-time limit may be defined as the time from a time point at which the host writes a real-time command to a submission queue to a time point at which a storage device writes a response to a real-time command in a completion queue.

The real-time limit RT_Limit may be set based on the ASIL grade. For example, when the ASIL grade is "D," the real-time limit RT_Limit may be set to be shortest. For example, when the ASIL grade is "C," the real-time limit RT_Limit may be set to be longer than when the ASIL grade is "D." For example, when the ASIL grade is "B," the real-time limit RT_Limit may be set to be longer than when the ASIL grade is "C." For example, when the ASIL grade is "A," the command is a general command and the real-time limit RT_Limit may not be set or may be set to be long.

The SQ time may indicate information on a time point at which the command has been written in the submission queue SQ.

Figures 7, 8:
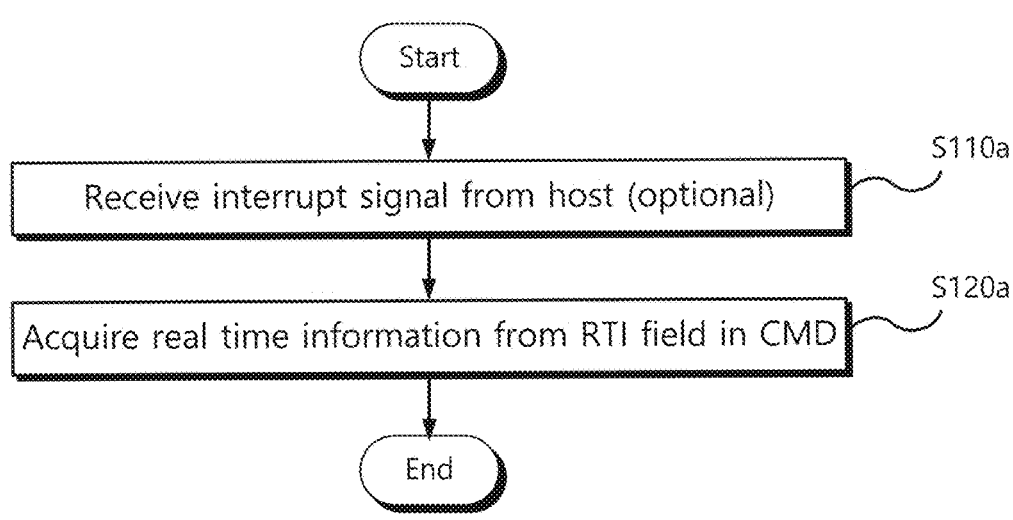
FIG. 7 is a flowchart illustrating an example of an operation of a storage controller according to an example embodiment.
FIG. 8 is a diagram illustrating an example of a real-time setting table according to an example embodiment.

FIG. 7 is a flowchart illustrating an example of an operation of a storage controller according to an example embodiment. For example, FIG. 7 illustrates an example in which the storage controller obtains real-time information from a host through a command.

In operation S110a, the storage controller 110C may receive an interrupt signal from a host. The interrupt signal may be a signal notifying that a real-time command has been written in a submission queue SQ. For example, the host may write the real-time command in the submission queue SQ and then transmit the interrupt signal to the storage controller 110C. However, this is only an example, and operation S110a of receiving the interrupt signal may be omitted according to example embodiments.

In operation S120a, the storage controller 110C may obtain real-time information from a real-time information field RTI in the command.

For example, the RTI checker 111a may check whether the command is a real-time command by checking the real-time flag RT_Flag of the real-time information field RTI. In addition, for example, the RTI checker 111a may check information on the time at which processing of the command should be completed by checking the real-time limit RT_Limit of the real-time information field RTI. In addition, for example, the RTI checker 111a may check information on the time at which the command has been written in the submission queue SQ by checking SQ time of the real-time information field RTI.

As described with reference to FIGS. 5, 6, and 7, the storage controller 110C according to an example embodiment may obtain real-time information through the real-time information field of the command. The obtained real-time information may later be referred to for the performance control of the storage device 100 (see FIG. 1).

FIG. 8 is a diagram illustrating an example of a real-time setting table according to an example embodiment. For ease of description, in FIG. 8, an example is provided in which a storage system is an automotive system and a plurality of hosts are first to fourth ECUs ECU1 to ECU4 of the automotive system. In addition, an example is provided in which the first to fourth ECUs ECU1 to ECU4 correspond to different ASIL grades.

The first to fourth ECUs ECU1 to ECU4 according to an example embodiment may have different ASIL grades and may match different physical functions (PF). In addition, the first to fourth ECUs ECU1 to ECU4 may have different real-time limits RT_Limit depending on the ASIL grades. Real-time information on each of the first to fourth ECUs ECU1 to ECU4 may be set in advance and managed as a real-time setting table.

According to an example embodiment, the first to fourth ECUs ECU1 to ECU4 may correspond to different ASIL grades. In this case, the first to fourth ECUs ECU1 to ECU4 may have different real-time limits RT_Limit.

For example, as illustrated in FIG. 8, commands issued by the first ECU (ECU1) may correspond to an ASIL grade "D." The first ECU ECU1 may be an ECU that controls functions which should be processed significantly urgently, such as, for example, airbag, braking, electric power steering, or the like. In this case, the command issued by the first ECU ECU1 may be a real-time command having a first real-time limit RT_Limit1. For example, the first real-time limit RT_Limit1 may be about 10 microseconds (ms).

In addition, for example, commands issued by the second ECU ECU2 may correspond to an ASIL grade "C." The second ECU ECU2 may be an ECU that controls functions which should be urgently processed, but less urgently than functions controlled by the first ECU ECU1, such as, for example, engine management, active suspension, or the like.

In this case, the command issued by the second ECU ECU2 may be a real-time command having a second real-time limit RT_Limit2. For example, the second real-time limit RT_Limit2 may be about 20 ms.

In addition, for example, commands issued by the third ECU ECU3 may correspond to an ASIL grade "B." The third ECU ECU3 may be an ECU that controls functions which should be processed relatively less urgently, such as, for example, headlights, radar cruise control, advanced driver assistance system (ADAS), or the like. In this case, the command issued by the third ECU ECU3 may be a real-time command having a third real-time limit RT_Limit3. For example, the third real-time limit RT_Limit3 may be about 30 ms.

In addition, for example, commands issued by the fourth ECU (ECU4) may correspond to an ASIL grade "A." The fourth ECU ECU4 may be an ECU that controls functions which do not need to be processed urgently, such as, for example, rear lights or the like. In this case, the command issued by the fourth ECU ECU4 may be a general command having a real-time limit RT_Limit.

According to an example embodiment, the first to fourth ECUs ECU1 to ECU4 may be pre-matched to different physical functions of different storage controllers 110C. For example, as illustrated in FIG. 8, the first to fourth ECUs ECU1 to ECU4 may be pre-matched to the first to fourth physical functions PF1 to PF4, respectively.

As described above, the real-time information on each of the first to fourth ECUs ECU1 to ECU4 may be set in advance and managed as a real-time setting table.

Figure 9:
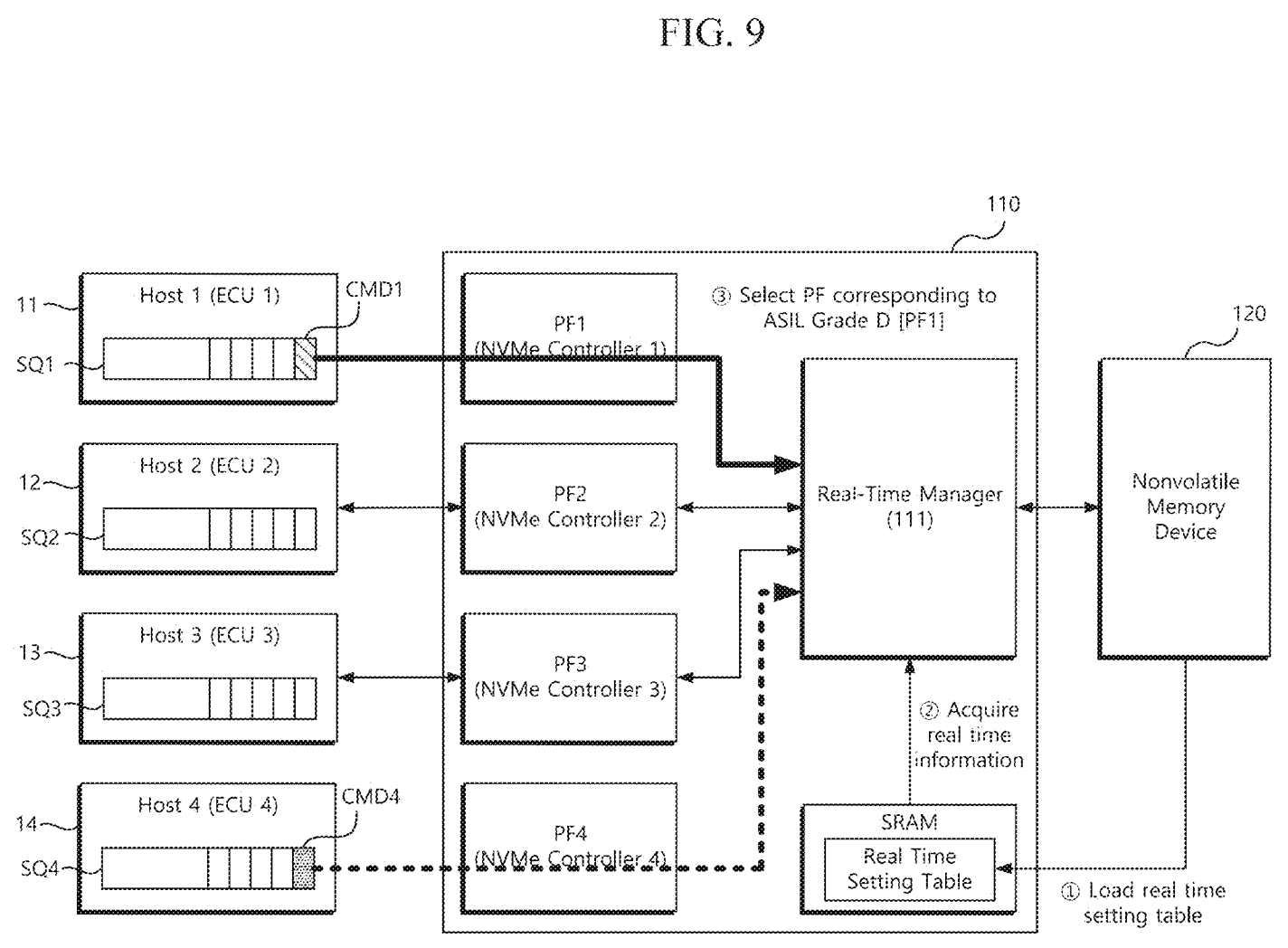

FIG. 9 is a diagram illustrating an example of an operation of a storage controller according to an example embodiment. For example, FIG. 9 illustrates an example in which the storage controller 110C obtains real-time information using the real-time setting table of FIG. 8.

Hereinafter, for ease of description, an example will be provided in which a first ECU 11 includes a first submission queue SQ1, and the first command CMD1 is written in the first submission queue SQ1. In addition, an example will be provided in which a fourth ECU 14 includes a fourth submission queue SQ4, and a fourth command CMD4 is written in a fourth submission queue SQ4. A configuration and an operation of the storage controller 110C in FIG. 9 are similar to those of the storage controllers 110A and 110C of FIGS. 3 and 5. Therefore, for convenience of explanation, redundant descriptions will be omitted below.

Referring to FIG. 9, in operation ①, a real-time setting table stored in the nonvolatile memory device 120 may be loaded into the SRAM 113. For example, when the storage device is powered up, the real-time setting table stored in the nonvolatile memory device 120 may be loaded into the SRAM 113.

In operation ②, the real-time manager 111 may obtain real-time information of the command written in a submission queue SQ of a host by referring to the real-time setting table stored in the SRAM 113. For example, the real-time manager 111 may obtain real-time information of the first command CMD1 and real-time information of the fourth command CMD4 by referring to the real-time setting table stored in the SRAM 113, respectively.

In operation ③, the real-time manager 111 may select a physical function such that the first command CMD1 corresponding to ASIL grade "D" is processed first. For example, the real-time manager 111 may preferentially select the first physical function (PF1) corresponding to the first command CMD1 having a real-time limit RT_Limit that is relatively short. After a processing operation on the first command CMD1 is completed, the real-time manager 111 may select a fourth physical function PF4 corresponding to the fourth command CMD4.

Figure 10:
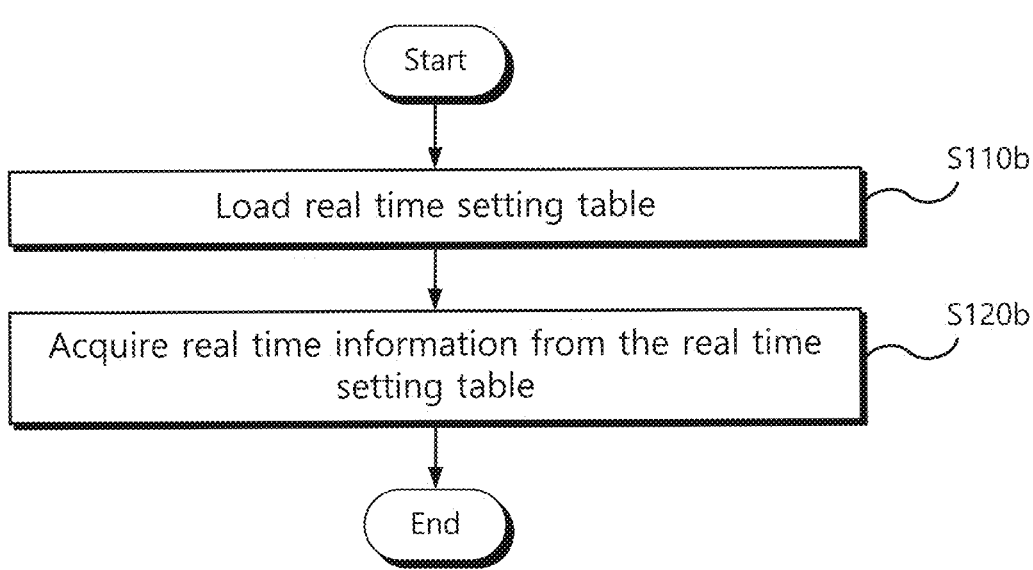
FIG. 10 is a flowchart illustrating an example of an operation of a storage controller according to an example embodiment.

FIG. 10 is a flowchart illustrating an example of an operation of a storage controller according to an example embodiment. For example, FIG. 10 illustrates an example in which a storage controller obtains real-time information through a real-time settings table.

In operation S110b, the storage controller 110C may load a real-time setting table stored in the nonvolatile memory device 120 into the SRAM 113.

For example, the physical function PF and the real-time limit RT_Limit corresponding to each of the plurality of hosts may be in predetermined states in the real-time setting table, as illustrated in FIG. 8. The storage controller 110C may load the real-time setting table having predetermined real-time information into the SRAM 113 from the nonvolatile memory device 120 during power-up.

In operation S120b, the storage controller 110C may obtain real-time information from the real-time settings table.

For example, when a specific host writes a command in the submission queue SQ, the storage controller 110C may obtain real-time information, such as, for example, the physical function (PF), real-time limit RT_Limit, or the like, by referring to the real-time setting table.

As described with reference to FIGS. 5 and 8 to 10, the storage controller 110C according to an example embodiment may obtain real-time information on a command written in the submission queue through a real-time settings table having predetermined real-time information. The obtained real-time information may later be referred to for performance control of the storage device 100 (see FIG. 1).

[Storage Device Selecting Physical Functions Based on Real-Time Information]

FIG. 11 is a block diagram illustrating a storage controller according to an example embodiment. For example, the controller 110D of FIG. 11 may be an example of the storage controller 110 of FIG. 2. The storage controller 110D of FIG. 11 is similar to the storage controller 110 and 110C of FIGS. 2 and 5. Accordingly, the same or similar components will be denoted by the same or similar reference numerals, and redundant descriptions will be omitted below.

Referring to FIG. 11, the storage controller 110D may include a real-time manager 111, a processor 112, an SRAM 113, a host interface circuit 114, and a nonvolatile memory interface circuit 115. The real-time manager 111 may include a real-time information (RTI) checker 111a, a command scheduler 111b, and a virtual time stamp (VTS) manager 111c.

The VTS manager 111c may be configured to manage a VTS table. The VTS table may include a VTS value for a physical function PF or a submission queue SQ corresponding to each of a plurality of hosts 11 to 1n (see FIG. 1). The VTS value may be defined as the product of input/output (IO) throughput and weight. For example, under the premise that weights are the same, a physical function PF having high IO throughput may have a relatively large VTS value, and a physical function PF having low IO throughput may have a relatively small VTS value.

The VTS manager 111c may manage a weight utilized to generate a VTS value. For example, different weights may be set for a physical function PF or a submission queue SQ corresponding to each of the plurality of hosts 11 to 1n (see FIG. 1). Weights may be set in various ways according to example embodiments. For example, the VTS manager 111c may set a low weight to correspond to a physical function PF having high IO throughput, and may set a high weight to correspond to a physical function PF having low IO throughput. However, this is only an example, and the VTS manager 111c may set the weight in various ways according to example embodiments.

The command scheduler 111b may select a physical function PF to process the command based on the VTS table. For example, the command scheduler 111b may be configured to select a physical function PF corresponding to a smallest VTS value from among a plurality of physical function PFs. In this case, performance for all of the hosts 11 to 1n may be uniform, or lowest performance for each of the hosts 11 to 1n may be guaranteed. However, this is only an example, and the command scheduler 111b may select the physical function PF in various ways according to example embodiments. For example, the command scheduler 111b may be configured to select a physical function PF corresponding to a largest value from among the plurality of physical function PFs.

According to an example embodiment, the VTS manager 111c may be configured to additionally manage real-time information.

For example, according to an example embodiment, the VTS manager 111c may additionally manage real-time information such as a real-time flag RT_Flag using the VTS table. In this case, the command scheduler 111b may preferentially select a physical function PF corresponding to the real-time command based on the real-time flag RT_Flag of the VTS table. Accordingly, the real-time command may be effectively processed.

For example, according to an example embodiment, the VTS manager 111*c* may manage the VTS table to have weights different depending on an ASIL grade or a real-time limit RT_Limit. For example, the VTS manager 111*c* may set the weight of the VTS table such that a real-time command having a relatively short real-time limit RT_Limit may be selected before a real-time command having a relatively long real-time limit RT_Limit. Accordingly, real-time commands may be effectively processed within a predetermined time.

FIG. 12 is a diagram illustrating an example of a VTS table according to an example embodiment. For example, the VTS table of FIG. 12 may be a table managed by the VTS manager 111*c* in FIG. 11. For ease of description, in FIG. 12, an example is provided in which first to third physical functions PF1 to PF3 are provided.

Referring to FIG. 12, the VTS table may manage a plurality of physical functions PF1 to PF3, and submission queues SQ1 to SQ3, weights W1 to W3, and VTS values VTS_SQ1 to VTS_SQ3, and real-time flags RT_Flag, respectively corresponding to the plurality of physical functions PF1 to PF3.

For example, the first physical function PF1 may correspond to the first submission queue (SQ1). The first physical function PF1 may have a first weight W1. A VTS value of the first physical function PF1 may be defined as the product of IO throughput and the first weight W1 of the first physical function PF1. The real-time flag RT_Flag may indicate whether a command to be processed by the first physical function PF1 is a real-time command.

Similarly, a submission queue SQ, a weight Weight, a VTS value VTS_Value, and real-time flags RT_Flag may be set for the second and third physical functions PF2 and PF3.

Figure 13:
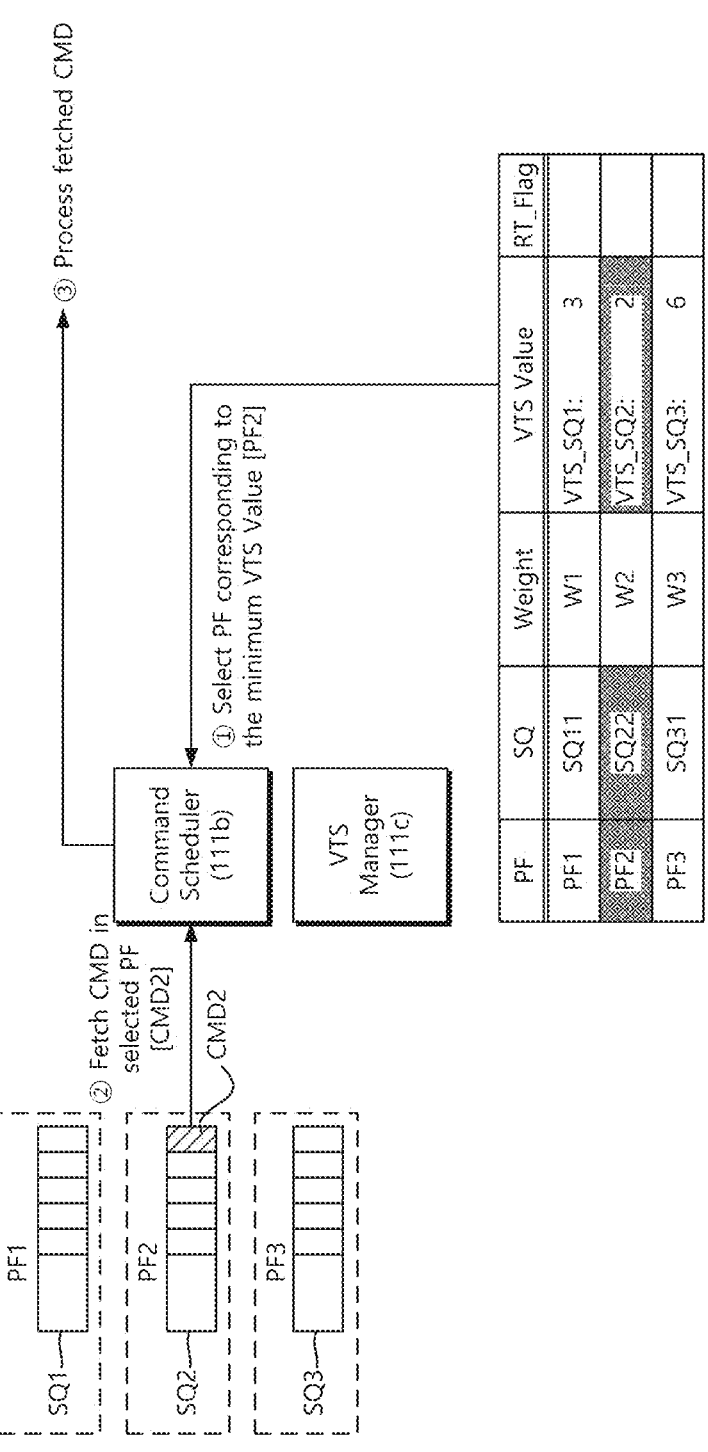
FIG. 13 is a diagram illustrating an example of an operation of a storage controller according to an example embodiment.

FIG. 13 is a diagram illustrating an example of an operation of a storage controller according to an example embodiment. For example, FIG. 13 illustrates an example of the operation of the storage controller 110D of FIG. 11 when a real-time command is not written in a submission queue SQ. Hereinafter, for ease of description, an example will be provided in which VTS values of first, second, and third physical functions PF1, PF2, and PF3 are "3," "2," and "6," respectively.

Referring to FIG. 13, in operation ①, when a real-time command is not written to the submission queue SQ, the command scheduler 111*b* may select a physical function PF based on the VTS values of the VTS table. For example, the command scheduler 111*b* may select a second physical function PF2 having a smallest VTS value.

In operation ②, the command scheduler 111*b* may fetch a second command CMD2 of a second submission queue SQ2 corresponding to the second physical function PF2. In operation ③, a processing operation may be performed on the fetched second command CMD2.

Figure 14A:
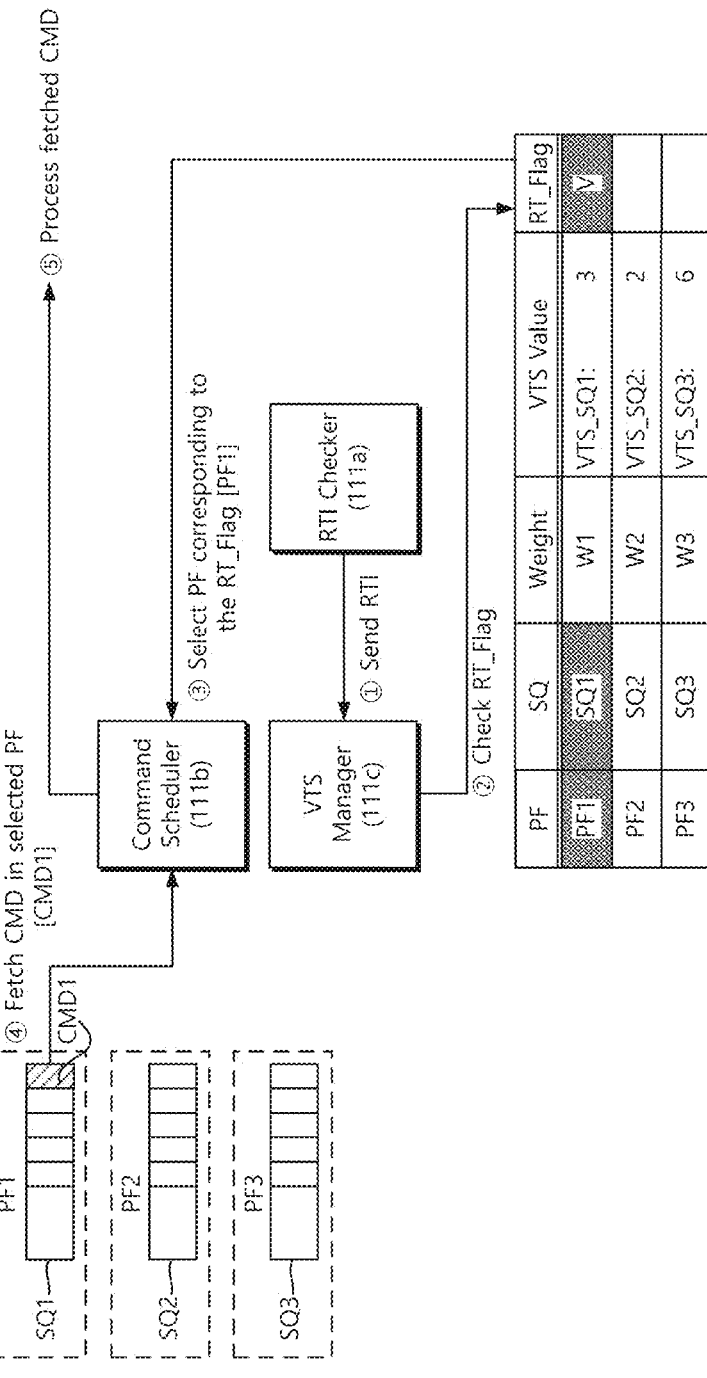
FIG. 14A is a diagram illustrating an example of an operation of a storage controller according to an example embodiment.

FIG. 14A is a diagram illustrating an example of an operation of a storage controller according to an example embodiment. For example, FIG. 14A illustrates an example of an operation of the storage controller 110D of FIG. 11 selecting a physical function PF through a real-time flag RT_Flag of the VTS table. For ease of description, in FIG. 13, an example is provided in which VTS values of the first, second, and third physical functions PF1, PF2, and PF3 are "3," "2," and "6," respectively. In addition, an example is provided in which a first command CMD1 of a first submission queue SQ1 is a real-time command.

Referring to FIG. 14A, in operation ①, an RTI checker 111*a* may obtain real-time information RTI and transmit the obtained RTI to a VTS manager 111*c*. Accordingly, the VTS manager 111*c* may confirm that a first command CMD1 of a first submission queue SQ1 is a real-time command.

In operation ②, the VTS manager 111*c* may enable a real-time flag RT_Flag of the physical function PF corresponding to the real-time command. For example, the VTS manager 111*c* may enable the real-time flag RT_Flag corresponding to the first submission queue SQ1.

In operation ③, a command scheduler 111*b* may select a physical function PF based on the real-time flag RT_Flag and VTS value of the VTS table. For example, when the enabled real-time flag RT_Flag is present, the command scheduler 111*b* may preferentially select a physical function PF corresponding to the enabled real-time flag RT_Flag regardless of the VTS value. For example, the command scheduler 111*b* may select the first physical function PF1 having the enabled real-time flag RT_Flag.

In operation ④, the command scheduler 111*b* may fetch the first command CMD1 of the first submission queue SQ1 corresponding to the first physical function PF1. In operation ⑤, a processing operation may be performed on the fetched first command CMD1.

Figure 14B:
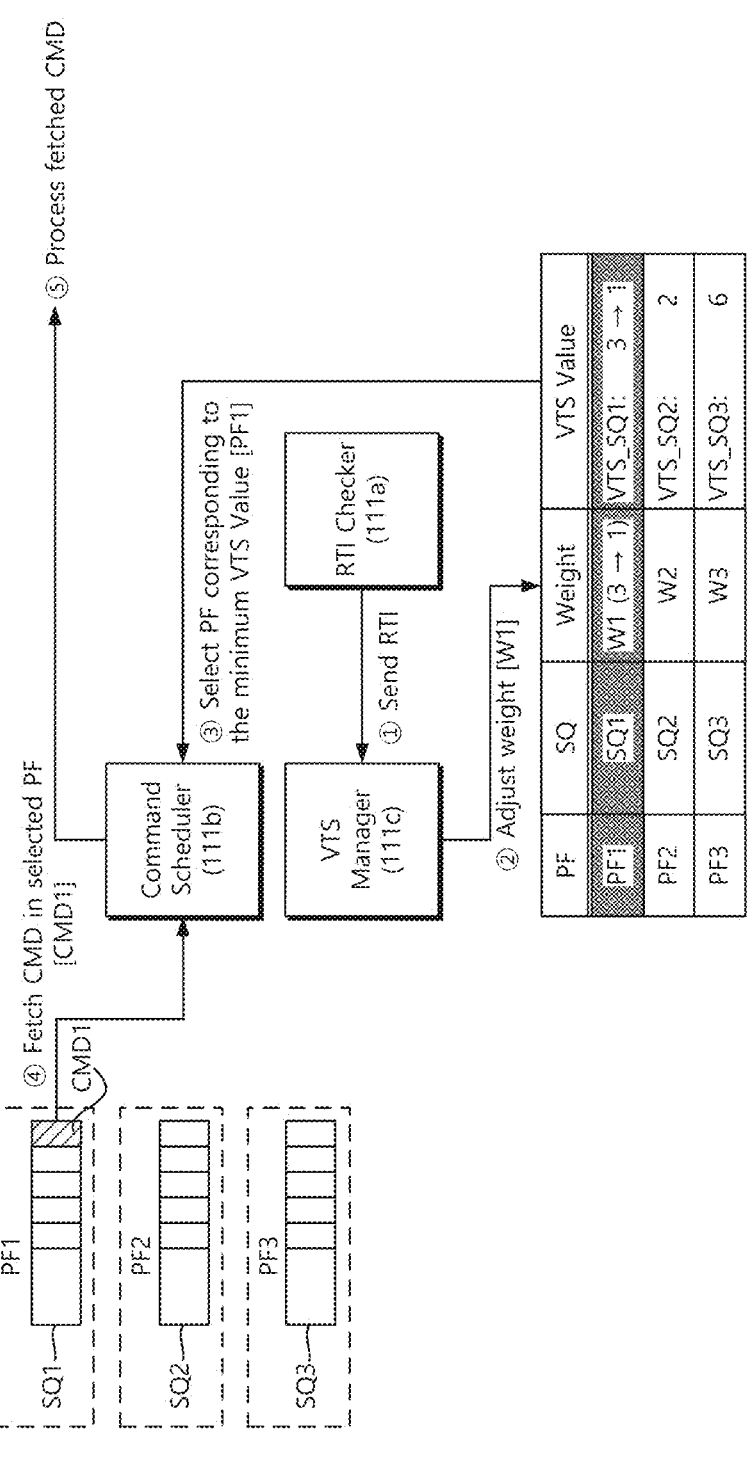
FIG. 14B is a diagram illustrating an example of an operation of a storage controller according to an example embodiment.

FIG. 14B is a diagram illustrating an example of an operation of a storage controller according to an example embodiment. For example, FIG. 14B illustrates an example of an operation of the storage controller 110D of FIG. 11 selecting a physical function PF by setting a weight of a VTS table. For ease of description, similar to FIG. 13, an example is provided in which initial VTS values of the first, second, and third physical functions PF1, PF2, and PF3 "3," "2," and "6," respectively. In addition, an example is provided in which a first command CMD1 of a first submission queue SQ1 is a real-time command.

Referring to FIG. 14B, in operation ①, an RTI checker 111*a* may obtain real-time information RTI and transmit the obtained RTI to a VTS manager 111*c*. Accordingly, the VTS manager 111*c* may confirm that the first command CMD1 of the first submission queue SQ1 is a real-time command.

In operation ②, the VTS manager 111*c* may adjust a weight of the physical function PF corresponding to the real-time command. For example, the VTS manager 111*c* may adjust the weight of the physical function PF corresponding to the real-time command such that a VTS value corresponding to the real-time command is smallest.

For example, as illustrated in FIG. 14B, the VTS manager 111*c* may adjust a first weight W1 corresponding to the first submission queue SQ1 from "3" to "1." Accordingly, a VTS value VTS_SQ1 of the first physical function PF1 may be adjusted from "3" to "1." As a result, the first physical function PF1 may be adjusted to have the smallest VTS value.

In operation ③, a command scheduler 111*b* may select the first physical function PF1 having the smallest VTS value.

In operation ③, the command scheduler 111*b* may fetch the first command CMD1 of the first submission queue SQ1 corresponding to the first physical function PF1. In operation ⑤, a processing operation may be performed on the fetched first command CMD1.

Figure 15:
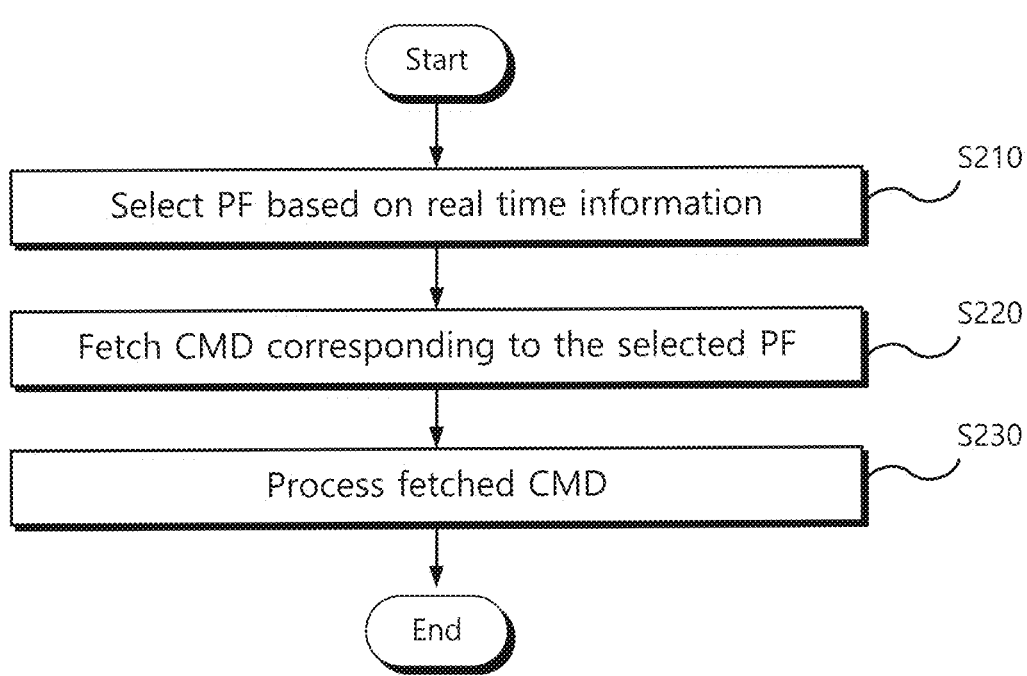
FIG. 15 is a flowchart illustrating an example of an operation of a storage controller according to an example embodiment.

FIG. 15 is a flowchart illustrating an example of an operation of a storage controller according to an example embodiment. For example, FIG. 15 illustrates an example of a storage controller selecting a physical function based on real-time information.

In operation S210, the storage controller 110D (see FIG. 11) may select a physical function PF based on real-time information.

According to an example embodiment, the storage controller 110D may include a VTS table, and the VTS table may manage a physical function PF, a weight, a VTS value, and a real-time flag RT_Flag corresponding to each of a plurality of hosts. When the real-time flag RT_Flag is enabled, the storage controller 110D may select a physical function PF corresponding to the enabled real-time flag RT_Flag, regardless of a size of the VTS value.

According to an example embodiment, the storage controller 110D may include a VTS table, and the VTS table may include a physical function PF, a weight, and a VTS value corresponding to each of a plurality of hosts. The weight may be set or adjusted to reflect a real-time limit RT_Limit. In this case, the storage controller 110D may select a physical function PF having a smallest VTS value.

In operation S220, the storage controller 110D may select a submission queue SQ corresponding to the selected physical function PF and fetch a real-time command written in the selected submission queue.

In operation S230, the storage controller 110D may perform a processing operation on the fetched real-time command.

As described with reference to FIGS. 11 to 15, the storage controller 110D according to an example embodiment may select a physical function PF based on a VTS table reflecting real-time information. Accordingly, a real-time command may be preferentially selected compared with a general command, or a real-time command having a relatively short real-time limit RT_Limit may be preferentially selected compared with a real-time command having a relatively long real-time limit RT_Limit. Accordingly, the real-time commands may be effectively processed.

[Storage Device Distributing Resources Based on Real-Time Information and/or State of Completion Queue]

Figure 16:
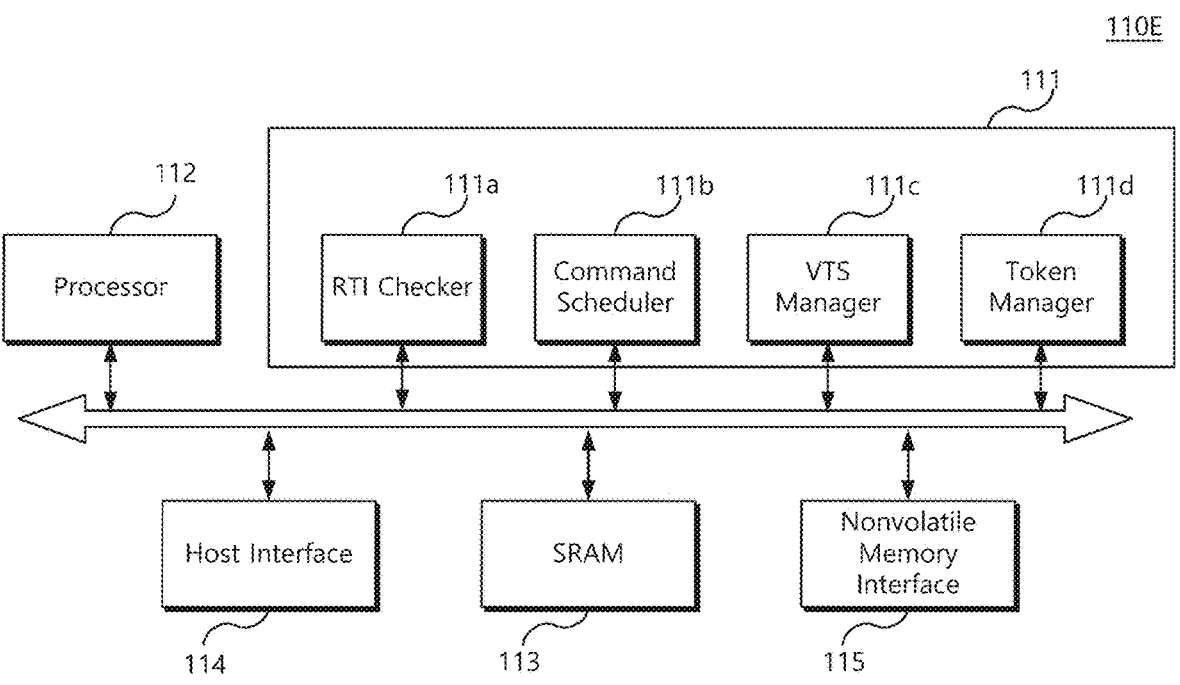
FIG. 16 is a block diagram illustrating a storage controller according to an example embodiment.

FIG. 16 is a block diagram illustrating a storage controller according to an example embodiment. For example, a controller 110E of FIG. 16 may be an example of the storage controller of FIG. 2. The storage controller 110E of FIG. 16 is similar to the storage controller of FIG. 11. Accordingly, the same or similar components will be denoted by the same or similar reference numerals, and redundant descriptions will be omitted below.

Referring to FIG. 16, the storage controller 110E may include a real-time manager 111, a processor 112, an SRAM 113, a host interface circuit 114, and a nonvolatile memory interface circuit 115. The real-time manager 111 may include a real-time information (RTI) checker 111a, a command scheduler 111b, a VTS manager 111c, and a token manager 111d.

The token manager 111d may be configured to provide a token to each of a plurality of physical function PFs based on real-time information. The number of tokens distributed to each physical function PF may be proportional to the amount of resources of the storage device 100 (see FIG. 1) assigned to each physical function PF.

According to an example embodiment, the token manager 111d may provide a larger number of tokens as a real-time limit RT_Limit is reduced. Accordingly, the shorter a real-time limit RT_Limit of a real-time command, the more resources of the storage device 100 may be assigned. As a result, the real-time command may be effectively processed.

According to an example embodiment, the token manager 111d may provide a token in consideration of a state of a completion queue CQ of each host. For example, the token manager 111d may provide tokens or adjust the number of tokens provided by referring to responses accumulated in the completion queue CQ. The responses accumulated in the completion queue CQ may be responses that have not yet been confirmed or referred to by a host. For example, the token manager 111d may distribute relatively fewer tokens to physical functions corresponding to hosts having a large number of responses accumulated in the completion queue CQ, and may distribute relatively more tokens to physical functions corresponding to hosts having a small number of responses accumulated in the completion queue CQ.

As described above, the storage controller 110D according to an example embodiment may provide a token to each physical function PF based on real-time information and/or a state of the completion queue CQ. Accordingly, real-time commands may be effectively processed.

Figure 17:
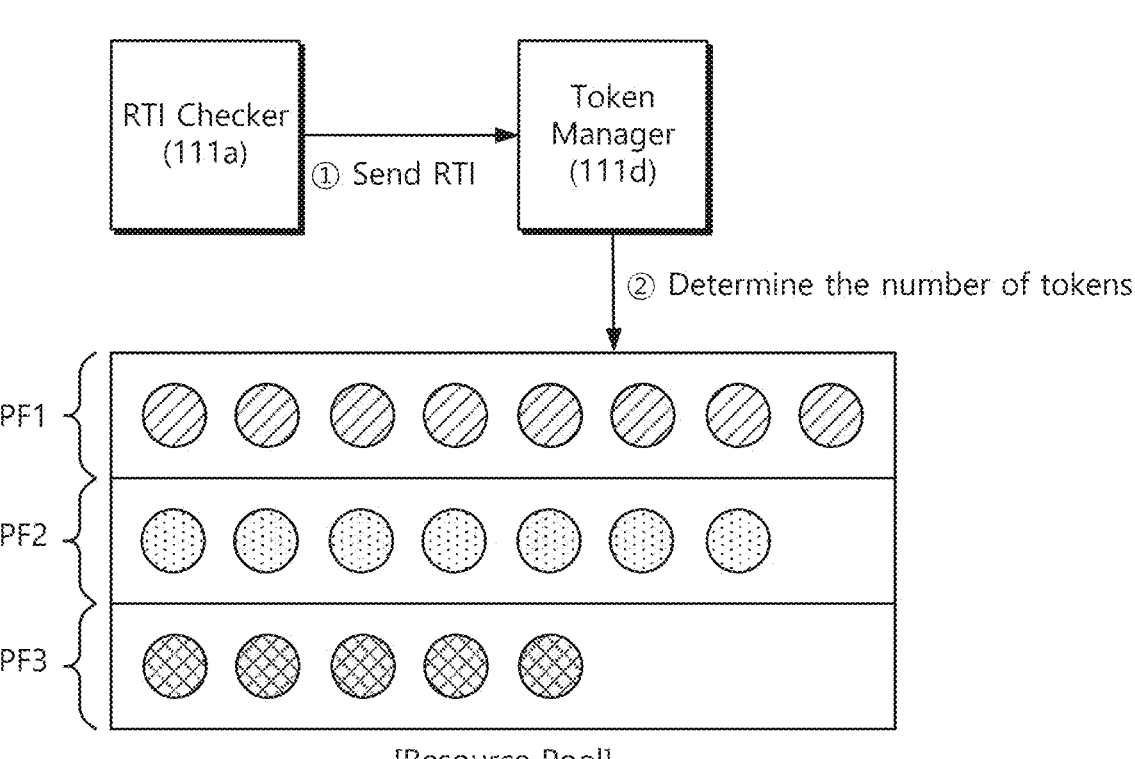
FIG. 17 is a diagram illustrating an example of an operation of a storage controller according to an example embodiment.

FIG. 17 is a diagram illustrating an example of an operation of a storage controller according to an example embodiment. For example, FIG. 17 illustrates an example of an operation of the storage controller 110E of FIG. 16 to determine the number of tokens to be distributed to each physical function PF based on real-time information. For ease of description, in FIG. 17, an example is provided in which 20 tokens correspond to the total amount of resources of the storage device 100 (see FIG. 1). In addition, an example is provided in which a length of the real-time limit RT_Limit increases in the order of the first, second, and third physical functions PF1, PF2, and PF3.

Referring to FIG. 17, in operation ①, the RTI checker 111a may obtain real-time information RTI and transmit the obtained RTI to a token manager 111d. Accordingly, the token manager 111d may check a real-time limit RT_Limit of a real-time command corresponding to each of the first to third physical functions PF1 to PF3.

In operation ②, the token manager 111d may determine the number of tokens to be distributed to each physical function PF. For example, a real-time limit RT_Limit corresponding to the first physical function PF1 is shortest, allowing the token manager 111d to provide the largest number of tokens to the first physical function PF1. In addition, a real-time limit RT_Limit corresponding to a third physical function PF3 is longest, allowing the token manager 111d to provide the smallest number of tokens to the first physical function PF1. Accordingly, the shorter the real-time limit RT_Limit, the faster the real-time limit RT_Limit may be processed.

Figure 18:
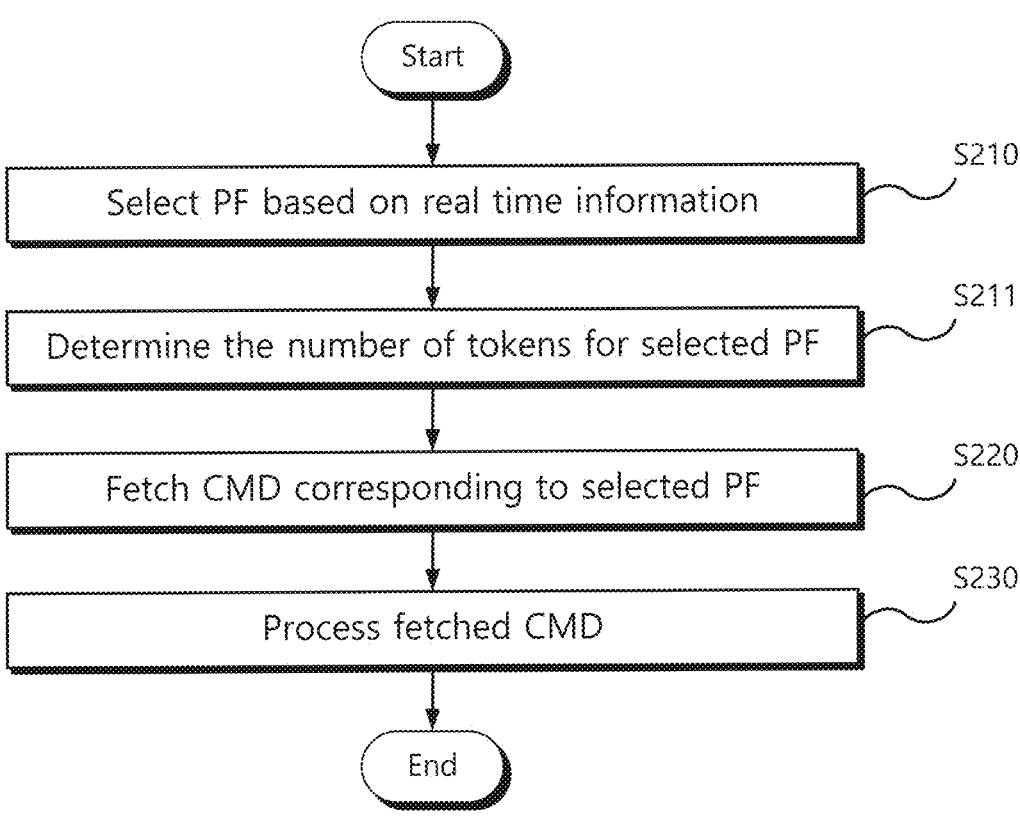
FIG. 18 is a flowchart illustrating an example of an operation of a storage controller according to an example embodiment.
Figure 19:
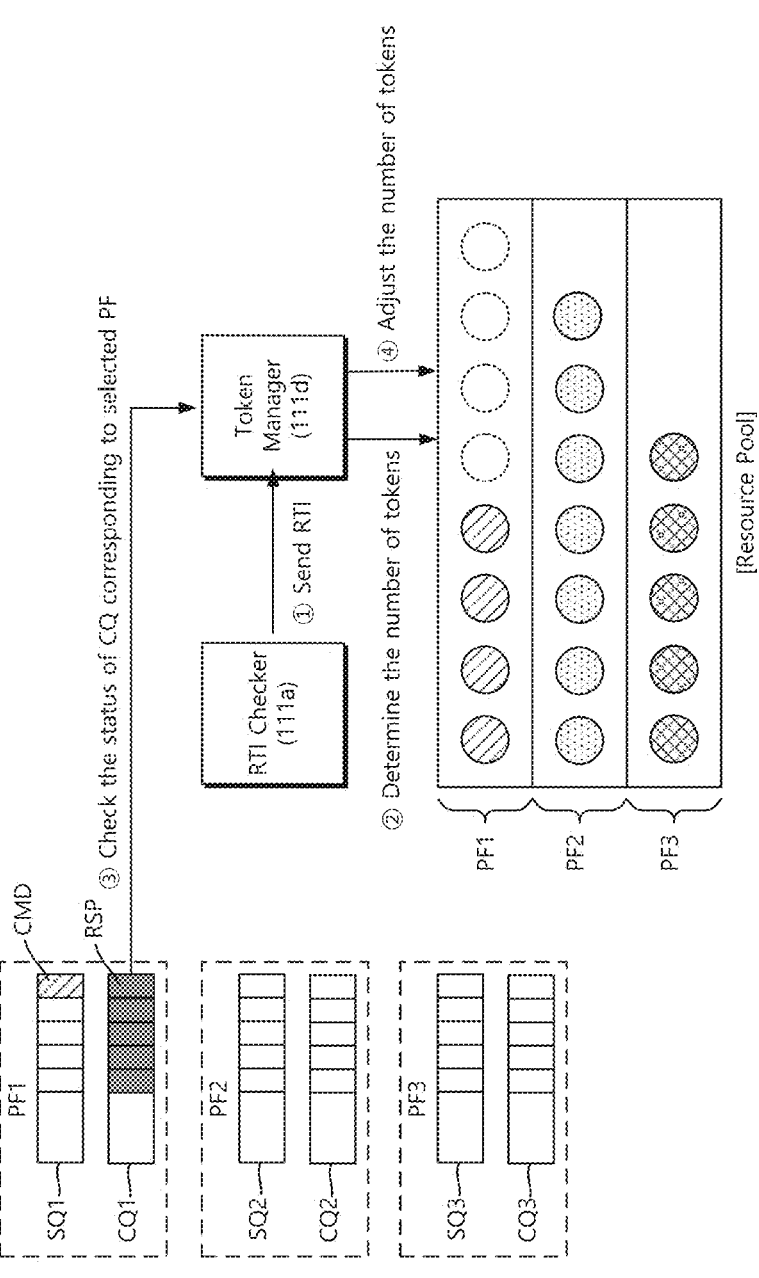
FIG. 19 is a diagram illustrating an example of an operation of a storage controller according to an example embodiment.

FIG. 18 is a flowchart illustrating an example of an operation of a storage controller according to an example embodiment. The operation of the storage controller of FIG. 19 is similar to the operation of the storage controller of FIG. 15. Therefore, redundant descriptions will be omitted below.

In operation S210, the storage controller 110E (see FIG. 16) may select a physical function PF based on real-time information.

In operation S211, the storage controller 110E may determine the number of tokens to be distributed to the selected physical function PF. For example, the shorter the real-time limit RT_Limit of the real-time command corresponding to the selected physical function PF, the more tokens the storage controller 110E may provide.

In operation S220, the storage controller 110E may select a submission queue SQ corresponding to the selected physical function PF and fetch a real-time command written in the selected submission queue.

In operation S230, the storage controller 110E may perform a processing operation on the fetched real-time command. In this case, the shorter the real-time limit RT_Limit of the real-time command, the more tokens may be provided. Therefore, the real-time command may be effectively processed within the real-time limit RT_Limit.

FIG. 19 is a diagram illustrating an example of an operation of a storage controller according to an example embodiment. For example, FIG. 19 illustrates an example of an operation of the storage controller 110E of FIG. 16 to adjust the number of tokens distributed to each physical function PF based on a state of a completion queue CQ.

For ease of description, similar to FIG. 17, in FIG. 19, an example is provided in which 20 tokens correspond to the total amount of resources of the storage device 100 (see FIG. 1). In addition, an example is provided in which the length of the real-time limit RT_Limit increases in the order of first, second, and third physical functions PF1, PF2, and PF3. In addition, an example is provided in which responses are accumulated in the first completion queue CQ1.

Referring to FIG. 19, in operation ①, an RTI checker 111a may obtain real-time information RTI and transmit the obtained RTI to a token manager 111d.

In operation ②, the token manager 111d may determine the number of tokens to be distributed to each physical function PF1. For example, 8 tokens, the largest number of tokens, may be distributed to the first physical function PF1, 7 tokens may be distributed to the second physical function PF2, and 5 tokens may be distributed to the third physical function PF3.

In operation ③, the token manager 111d may check a state of a completion queue CQ of each physical function PF. For example, the token manager 111d may confirm that responses are accumulated in the first completion queue CQ1 of the first physical function PF1.

In operation ④, the token manager 111d may adjust the number of distributed tokens based on the state of the completion queue CQ of each physical function PF. For example, responses are accumulated in the first completion queue CQ1, so that the real-time command corresponding to the first physical function PF1 may be processed relatively slowly. Accordingly, the token manager 111d may adjust the number of tokens distributed to the first physical function PF1 from "8" to "4." Accordingly, the resources of the storage device 100 may be distributed more efficiently.

Figure 20:
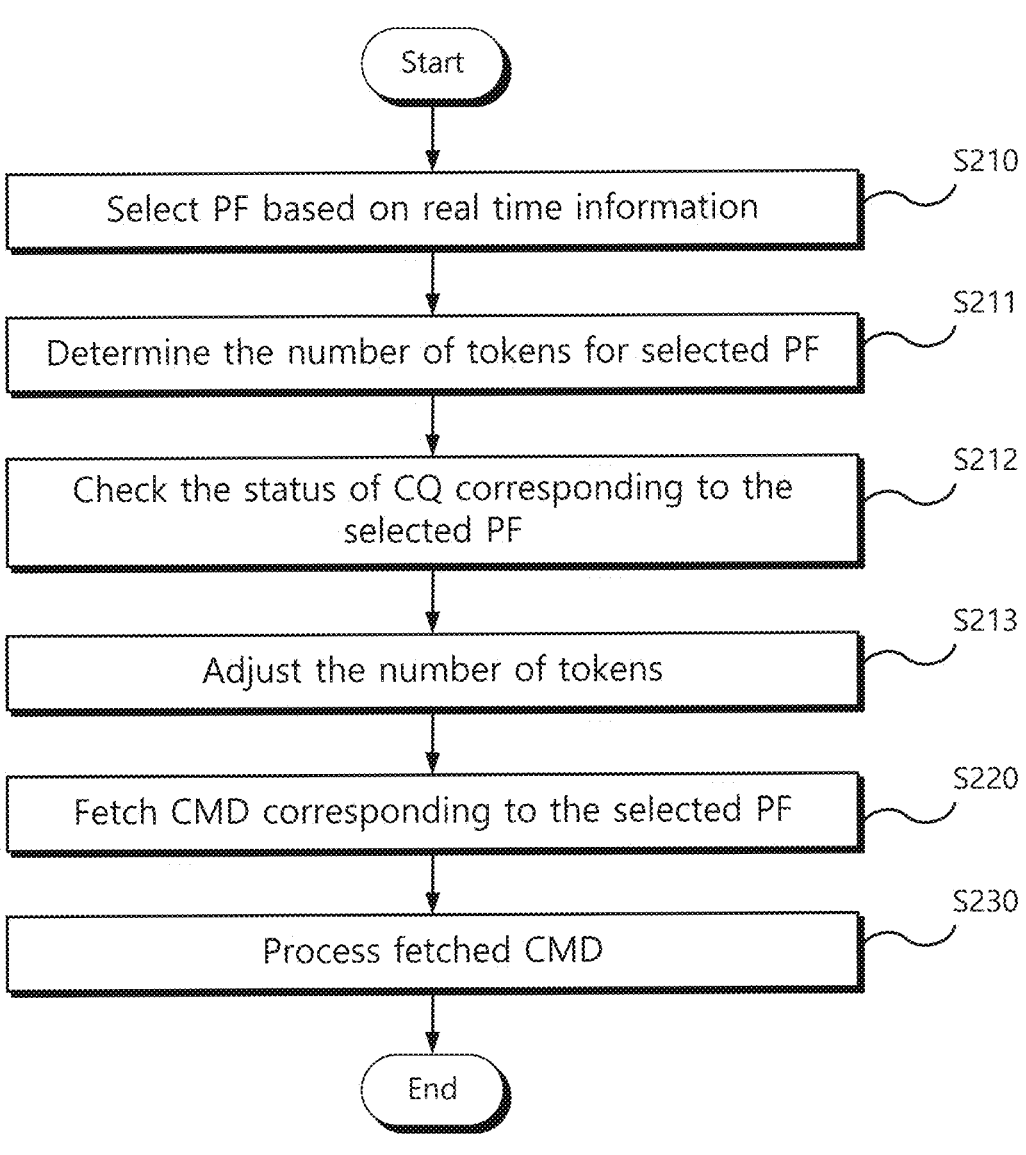
FIG. 20 is a flowchart illustrating an example of an operation of a storage controller according to an example embodiment.

FIG. 20 is a flowchart illustrating an example of an operation of a storage controller according to an example embodiment. The operation of the storage controller of FIG. 20 is similar to the operation of the storage controller of FIG. 18. Therefore, redundant descriptions will be omitted below.

In operation S210, the storage controller 110E (see FIG. 16) may select a physical function PF based on real-time information.

In operation S211, the storage controller 110E may determine the number of tokens to be distributed to the selected physical function PF.

In operation S212, the storage controller 110E may check a state of a completion queue CQ corresponding to the selected physical function PF.

In operation S213, the storage controller 110E may adjust the number of distributed tokens based on the state of the completion queue CQ. For example, when a large number of responses are accumulated in the completion queue CQ, the storage controller 110E may deduct the number of tokens corresponding to the corresponding physical function PF.

In operation S220, the storage controller 110E may select a submission queue SQ corresponding to the selected physical function PF and fetch a real-time command written in the selected submission queue.

In operation S230, the storage controller 110E may perform a processing operation on the fetched real-time command.

As described with reference to FIGS. 16 to 20, the storage controller 110E according to an example embodiment may provide or adjust a token to each physical function PF based on real-time information and/or a status of the completion queue CQ. Accordingly, real-time commands may be effectively processed.

[Storage Controller Determining Fetch Timing Based on Real-Time Information]

Figure 21:
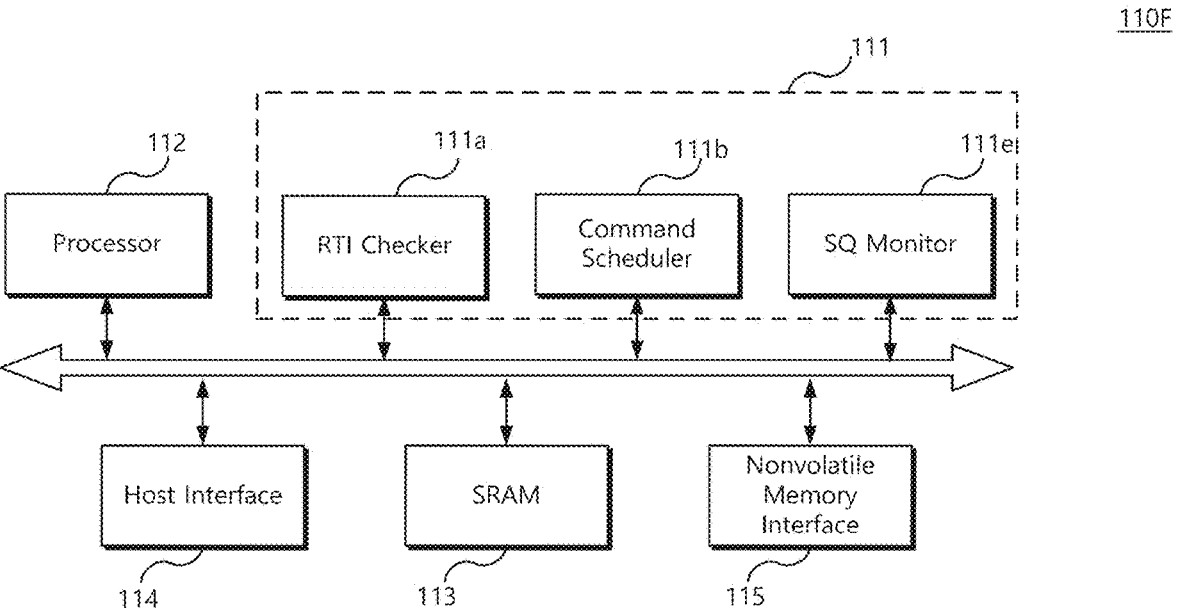
FIG. 21 is a block diagram illustrating a storage controller according to an example embodiment.

FIG. 21 is a block diagram illustrating a storage controller according to an example embodiment. For example, a storage controller 110F of FIG. 21 may be an example of the storage controller of FIG. 2. The storage controller 110F of FIG. 21 is similar to the storage controller 110 of FIGS. 2 and 5. Accordingly, the same or similar components will be denoted by the same or similar reference numerals, and redundant descriptions will be omitted below.

Referring to FIG. 21, the storage controller 110F may include a real-time manager 111, a processor 112, an SRAM 113, a host interface circuit 114, and a nonvolatile memory interface circuit 115. The real-time manager 111 may include a real-time information (RTI) checker 111a, a command scheduler 111b, and an SQ monitor 111e.

The SQ monitor 111e may monitor a submission queue SQ corresponding to each of the plurality of hosts 11 to 1n (see FIG. 1). When it is found that a new command has been written in a single submission queue SQ, the SQ monitor 111e may transmit the new command to the RTI checker 111a. In this case, the RTI checker 111a may obtain real-time information on the command newly written in the submission queue SQ.

According to an example embodiment, a monitoring period of the SQ monitor 111e may be set to be shorter than the real-time limit RT_Limit. For example, when the storage system 10 (see FIG. 1) is an automotive system, the monitoring period of the SQ monitor 111e may be set to be shorter than a real-time limit RT_Limit corresponding to the ASIL grade "D." Accordingly, sufficient time utilized to select a physical function PF corresponding to a command written in the submission queue SQ, fetch the command, and perform an operation of processing the fetched command may be secured.

In addition, according to an example embodiment, fetch timing of the command scheduler 111b may be set in consideration of a time point at which the SQ monitor 111e detects that a new command has been written in the submission queue SQ.

For example, when the SQ monitor 111e detects that a new command has been written in the submission queue SQ relatively late, the command scheduler 111b may fetch the command relatively early. For example, when the SQ monitor 111e detects that a new command has been written to the submission queue SQ relatively early, the command scheduler 111b may fetch the command relatively late. Accordingly, sufficient time utilized to select the physical function PF corresponding to the command written in the submission queue SQ, fetch the command, and perform an operation of processing the fetched command may be secured.

Figure 22:
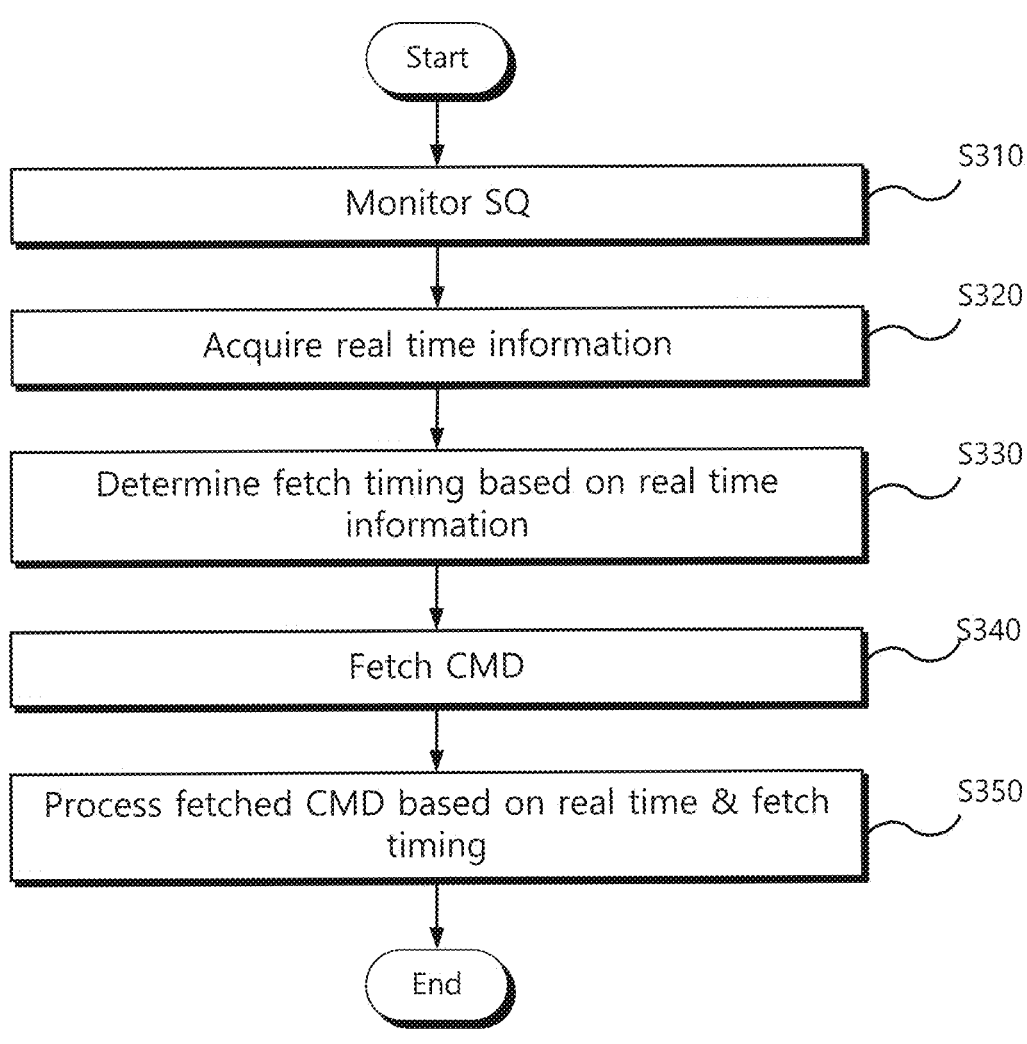
FIG. 22 is a flowchart illustrating an example of an operation of a storage controller according to an example embodiment.

FIG. 22 is a flowchart illustrating an example of an operation of a storage controller according to an example embodiment.

In operation S310, the storage controller 110F (see FIG. 21) may monitor a submission queue SQ of each host. In this case, a monitoring period for a submission queue SQ of each host may be set to be shorter than a real-time limit RT_Limit.

In operation S320, the storage controller 110F may obtain real-time information on a command newly written to the submission queue SQ. For example, the storage controller 110F may obtain real-time information through ae real-time information field of the command. For example, the storage controller 110F may obtain real-time information through a real-time settings table manage by a storage device.

In operation S330, the storage controller 110F may determine fetch timing for the command newly written in the submission queue SQ. For example, the storage controller 110F may determine the fetch timing in consideration of a time point at which the storage controller 110F detects that the new command has been written in the submission queue SQ, and the real-time limit RT_Limit of the command.

In operation S340, the storage controller 110F may select a physical function PF and a submission queue SQ corresponding to the physical function PF, and may fetch a real-time command written in the selected submission queue.

In operation S350, the storage controller 110F may perform a processing operation on the fetched real-time command.

As described above, the storage controller 110F according to an example embodiment may determine a monitoring period for the submission queue SQ and/or the fetch timing for the real-time command in consideration of real-time information. Accordingly, real-time commands may be effectively processed within the real-time limit RT_Limit.

As set forth above, a storage system according to example embodiments may effectively process real-time commands received from a host within a predetermined time.

It will be understood that the above descriptions are illustrative and example embodiments are not limited thereto. For example, according to an example embodiment, a real-time manager may perform operations of selecting a physical function, distributing resources, and/or determining fetch timing in consideration of an existing command that is being processed before fetching a real-time command, an operation of a nonvolatile memory device corresponding to the command, and/or a channel situation. In addition, according to example embodiments, the real-time manager may predict a processing time when a real-time command is processed in a storage device, and may distribute resources based on the predicted processing time. Alternatively, according to example embodiments, the real-time manager may predict a processing time at which a real-time manager is processed in a storage device, and may determine priority for processing real-time commands based on the predicted processing time. As described above, real-time commands according to example embodiments may be applied in various ways.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A storage device, comprising:
a nonvolatile memory device; and
a storage controller configured to control the nonvolatile memory device under control of a plurality of hosts,
wherein
the storage controller comprises:
a plurality of physical functions respectively corresponding to the plurality of hosts; and
a real-time manager configured to control the plurality of physical functions based on real-time information of a real-time command when the real-time command is issued from at least one host among the plurality of hosts,
wherein the real-time information includes a real-time limit obtained from (i) a real-time information field in the real-time command that includes the real-time limit indicating a time from a time point at which the real-time command is written in a submission queue to a time point at which a response corresponding to the real-time command is written in a completion queue, or (ii) a real-time setting table managed by the storage device and including a plurality of real-time limits respectively matching the plurality of physical functions.

2. The storage device of claim 1, wherein
the real-time manager selects a physical function corresponding to a host that issued the real-time command prior to a physical function corresponding to a host that issued a general command, among the plurality of physical functions.

3. The storage device of claim 2, wherein
the real-time manager selects the physical function corresponding to the host that issued the real-time command, among the plurality of physical functions, based on a virtual time stamp (VTS) table, and
the VTS table comprises:
a plurality of weights respectively corresponding to the plurality of physical functions;
a plurality of VTS values, respectively corresponding to the plurality of physical functions, and set based on input/output (IO) throughput and a weight of each of the plurality of physical functions; and
a plurality of real-time flags, respectively corresponding to the plurality of physical functions, and indicating whether real-time commands of the plurality of physical functions match each other.

4. The storage device of claim 3, wherein
the real-time manager comprises:
a VTS manager configured to manage the VTS table; and
a command scheduler configured to select a physical function to process a command, from among the plurality of physical functions,
wherein the VTS manager enables a real-time flag of a physical function corresponding to the host that issued the real-time command, among the plurality of real-time flags of the VTS table, and
the command scheduler selects a physical function corresponding to the host that issued the real-time command, based on the enabled real-time flag, from among the plurality of physical functions.

5. The storage device of claim 3, wherein the real-time manager comprises:

a VTS manager configured to manage the VTS table; and a command scheduler configured to select a physical function to process a command, from among the plurality of physical functions, wherein the VTS manager adjusts a weight of a physical function corresponding to the host that issued the real-time command, among the plurality of weights of the VTS table.

6. The storage device of claim 5, wherein the VTS manager adjusts a weight to decrease a VTS value of a physical function corresponding to the host that issued the real-time command, among the plurality of VTS values, wherein the command scheduler selects a physical function corresponding to a smallest VTS value, among the plurality of VTS values.

7. The storage device of claim 1, wherein the real-time manager determines a number of tokens to be distributed to each of the plurality of physical functions, based on the real-time information.

8. The storage device of claim 7, wherein the number of tokens distributed to a physical function corresponding to the host that issued the real-time command is larger than the number of tokens distributed to a physical function corresponding to a host that did not issue the real-time command.

9. The storage device of claim 7, wherein the real-time manager adjusts the number of tokens distributed to each of the plurality of physical functions based on a state of a completion queue corresponding to each of the plurality of hosts.

10. The storage device of claim 9, wherein the real-time manager deducts the number of tokens distributed to the physical function corresponding to the host that issued the real-time command when a number of responses accumulated in a completion queue of the host that issued the real-time command is larger than or equal to a reference number.

11. The storage device of claim 1, wherein the real-time manager comprises:

a real-time information (RTI) checker configured to check the real-time information; and a command scheduler configured to select a physical function to process a command, based on the real-time information, from among the plurality of physical functions, wherein the RTI checker obtains the real-time information through the real-time information field included in the real-time command.

12. The storage device of claim 11, wherein the real-time information further comprises an SQ time, and the SQ time indicates the time point at which the real-time command is written in the submission queue.

13. The storage device of claim 1, wherein the real-time manager comprises:

a real-time information (RTI) checker configured to check the real-time information of the real-time command; and a command scheduler configured to select a physical function to process a command, based on the real-time information, from among the plurality of physical functions, wherein the RTI checker obtains the real-time information through the real-time setting table managed by the storage device.

14. The storage device of claim 13, wherein the real-time setting table comprises:

the plurality of physical functions, respectively matching the plurality of hosts;

a plurality of automotive safety integrity level (ASIL) grades, respectively matching the plurality of physical functions; and a plurality of real-time limits, respectively matching the plurality of physical functions, wherein each of the plurality of real-time limits is set based on a corresponding ASIL grade, among the plurality of ASIL grades.

15. The storage device of claim 1, wherein the real-time manager determines a fetch timing for the real-time command based on the real-time information.

16. The storage device of claim 15, wherein the real-time manager fetches the real-time command faster as the real-time limit corresponding to the real-time command becomes shorter.

17. A method of operating a storage device comprising a plurality of physical functions, respectively corresponding to a plurality of hosts, the method comprising:

obtaining real-time information on a real-time command issued by at least one host among the plurality of hosts;

determining a performance of a physical function corresponding to the real-time command, among the plurality of physical functions, based on the real-time information; and fetching the real-time command and processing the fetched real-time command, wherein the real-time information comprises a real-time limit, and the fetching is conducted faster as the real-time limit corresponding to the real-time command becomes shorter.

18. The method of claim 17, wherein determining the performance of the physical function corresponding to the real-time command comprises:

selecting a physical function corresponding to a host that issued the real-time command prior to a physical function corresponding to a host that did not issue the real-time command;

distributing a larger number of tokens to the physical function corresponding to the host that issued the real-time command than to the physical function corresponding to the host that did not issue the real-time command; and adjusting the number of tokens distributed to the physical function corresponding to the host that issued the real-time command, based on a state of a completion queue of the host that issued the real-time command.

19. The method of claim 17, wherein the real-time information is obtained from one of a real-time information field included in the real-time command and a real-time setting table managed by the storage device.

20. A storage controller that controls a nonvolatile memory device, the storage controller comprising:

a nonvolatile memory interface circuit for communicating with the nonvolatile memory device;

a plurality of physical functions, respectively correspond-
ing to a plurality of hosts, and independently control-
ling the nonvolatile memory device based on a request
of each of the plurality of hosts; and
a real-time manager configured to perform a performance
control operation on the plurality of physical functions
based on real-time information of a real-time command
when the real-time command is issued from at least one
host among the plurality of hosts,
wherein the real-time information includes a real-time
limit obtained from (i) a real-time information field in
the real-time command that includes the real-time limit
indicating a time from a time point at which the
real-time command is written in a submission queue to
a time point at which a response corresponding to the
real-time command is written in a completion queue, or
(ii) a real-time setting table managed by a storage
device and including a plurality of real-time limits
respectively matching the plurality of physical func-
tions.

* * * * *